(12) United States Patent
Taguchi et al.

(10) Patent No.: US 6,724,702 B2
(45) Date of Patent: Apr. 20, 2004

(54) APPARATUS FOR REPRODUCING RECORDED DATA

(75) Inventors: Masakazu Taguchi, Kawasaki (JP); Akiyoshi Uchida, Kawasaki (JP); Toshikazu Kanaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 176 days.

(21) Appl. No.: 09/997,325

(22) Filed: Nov. 29, 2001

(65) Prior Publication Data

US 2002/0131351 A1 Sep. 19, 2002

(30) Foreign Application Priority Data

Mar. 14, 2001 (JP) .................................. 2001-072841
Sep. 21, 2001 (JP) .................................. 2001-288470

(51) Int. Cl.$^7$ ................................................ G11B 7/00
(52) U.S. Cl. .................. 369/47.17; 369/53.1; 369/59.1; 369/44.32
(58) Field of Search ......................... 369/47.1, 47.15, 369/47.17, 47.18, 53.1, 53.13, 53.12, 53.33, 53.35, 59.1, 44.28, 44.32

(56) References Cited

U.S. PATENT DOCUMENTS 5,729,514 A * 3/1998 Horigome et al. ....... 369/47.17
6,377,525 B1 * 4/2002 Iida ......................... 369/47.17

FOREIGN PATENT DOCUMENTS

| JP | 58121138 A | 7/1983 |
| JP | 05205280 A | 8/1993 |
| JP | 08287470 A | 1/1996 |

* cited by examiner

Primary Examiner—Muhammad Edun
(74) Attorney, Agent, or Firm—Greer, Burns & Crain, Ltd.

(57) ABSTRACT

In an apparatus for reproducing recorded data, a crosstalk signal is generated by converting adjacent data recorded on an adjacent track into a waveform of said reproduction signal and the crostalk signal is deducted from the reproduction signal. Then, the reproduction signal in which the crosstalk signal is eliminated is decoded in accordance with the predetermined algorithm and reproduced.

25 Claims, 23 Drawing Sheets

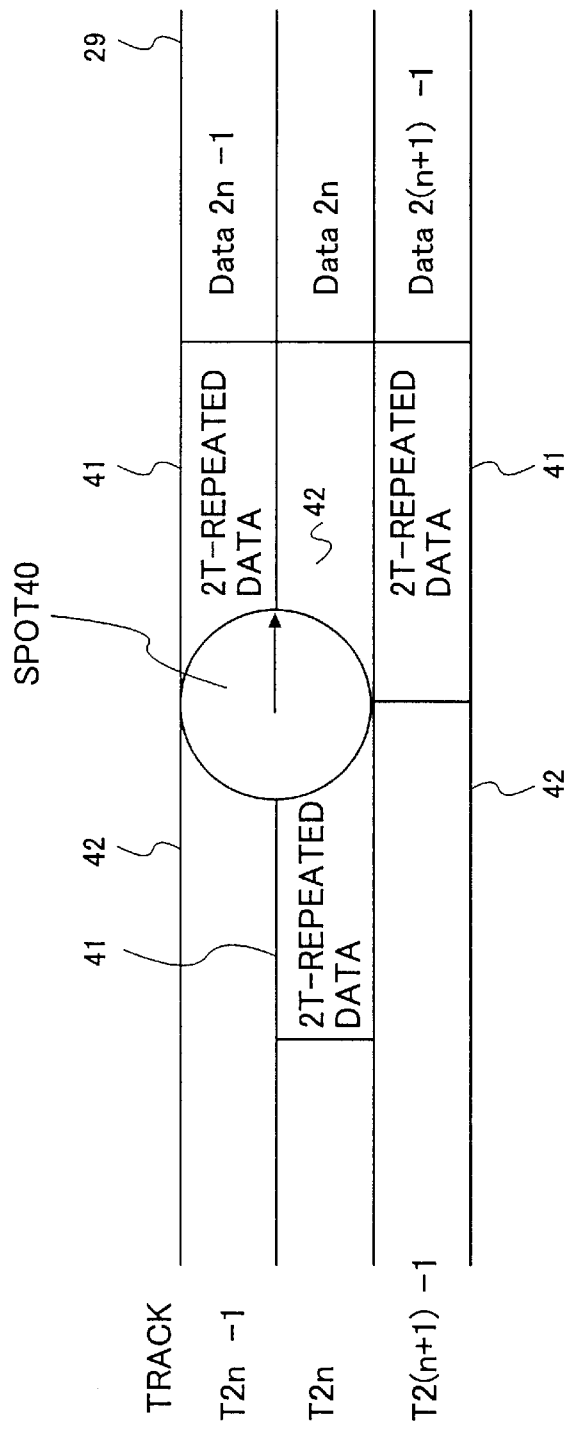

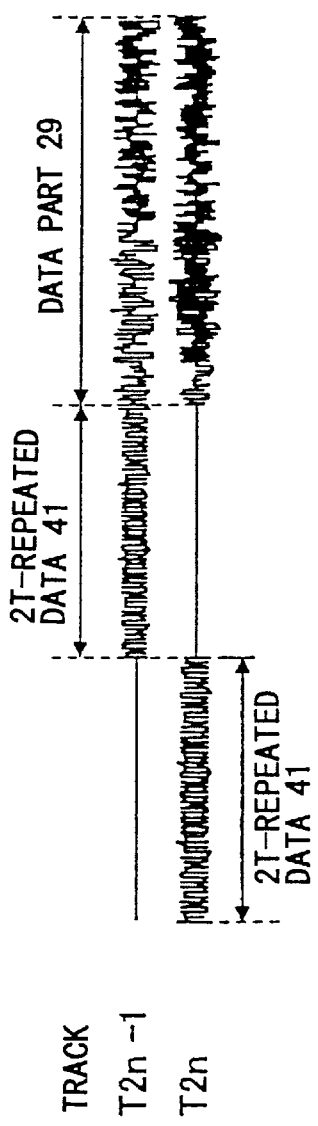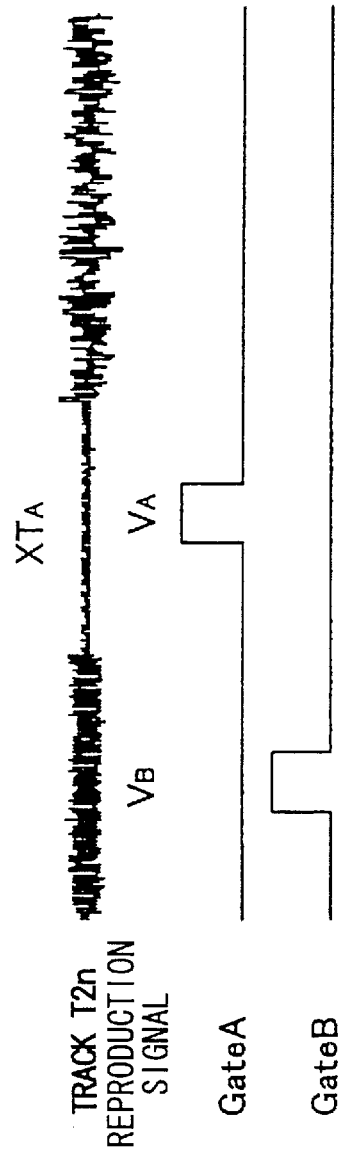

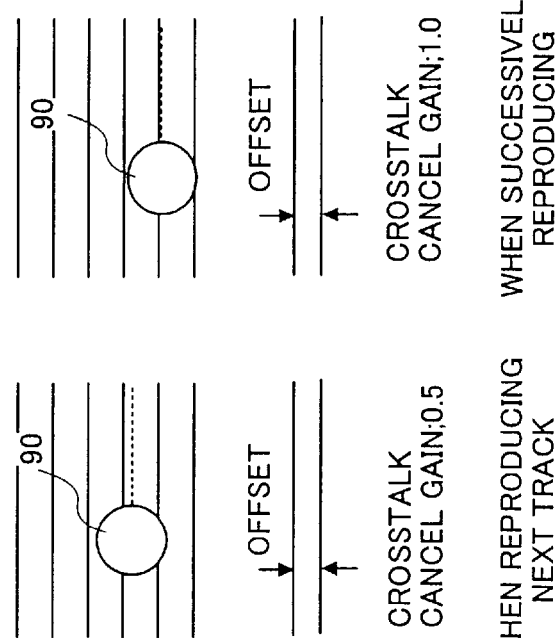
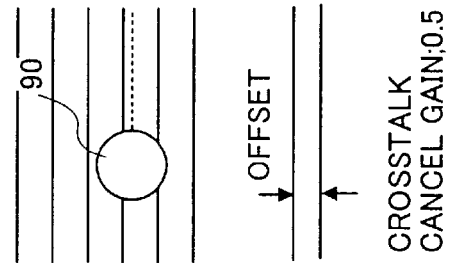
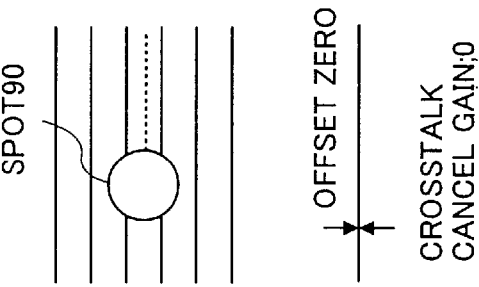
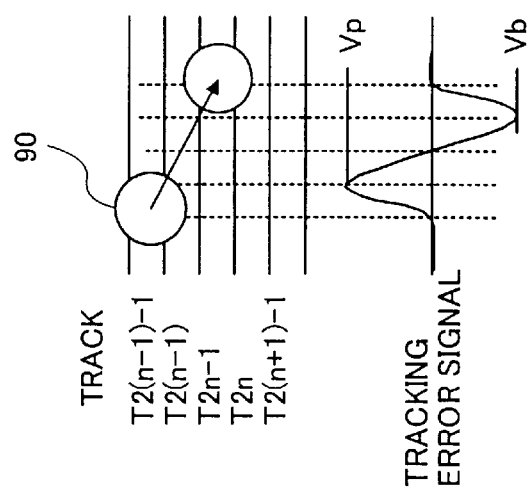

APPARATUS FOR REPRODUCING RECORDED DATA

BACKGROUND OF THE INVENTION

1. Field of the Invention

The present invention generally relates to an apparatus for reproducing recorded data and a record format to record data, and more particularly to an apparatus for reproducing recorded data that reproduces a target track to be reproduced and an adjacent track by one beam, a crosstalk signal is generated, and the crosstalk is cancelled by deducting the crosstalk signal from a reproduction signal.

2. Description of the Related Art

To record data, various recording media have been provided such as a magnetic disk, a magnetic tape, an optical disc, and a magneto-optical disc. In order to record data on these recording media, a magnetic record mark is mainly used, since compared with semiconductor memory, data can be permanently stored at a low cost. Thus, apparatus using these recording media have been essentially needed to record information such as a graphic, image information or the like, for computers, at a present age in which much information is dealt with.

FIG. 1 is a diagram showing an example of a circuit configuration of a conventional data reproducing apparatus.

An optical head 11 reproduces a signal from a recording medium 10 such as an optical disk or a magneto-optical disc. In order to recognize an address at which information is recorded, an SUM/ID detector 19 detects address information from a SUM signal or a Wobble signal, and then an ODC (optical control circuit) 20 recognizes the address.

Moreover, a reference clock CLK is made from a PLL (Phase-Locked Loop) 18 synchronizing with a signal from a clock mark provided on the recording medium 10 for reproducing data. A signal process is conducted based on this reference clock CLK and then data is detected.

A reproduction signal from the optical head 11 is amplified by an amplifier 12, a high frequency noise is eliminated by a LPF (low pass filter) 13, and then the reproduction signal is supplied to an ADC (A/D converter) 14. A high-pass filter is not shown in FIG. 1 but is generally provided for low-pass fluctuation suppression and circuit saturation prevention. Alternatively, an analog equalizer may be used for waveform equalization.

The ADC 14 samples by a reference clock CLK supplied from the PLL 18. In a case in which data recording condition is different for each of data reproducing apparatuses, a phase of the reproduction signal may be shifted from that of the clock synchronized with the clock mark formed by the pre-pit. For this reason, the phase of the reference clock CLK (not shown in FIG. 1) may be adjusted.

An EQ (digital equalizer) 15 equalizes and forms a waveform based on a sample value sampled by the ADC 14. Then, the sample value is equalized into a PR (Partial Response) signal. The PR signal is detected by a ML (most-likelihood) detector 16 and then is decoded by a decoder 17.

Decoded data is sent to the ODC 20, and an ECC decode is carried out. An ECC (Error Correcting Code) check is conducted for the decoded data. FIG. 2 is a schematic diagram showing an example of a format. In FIG. 2, a simplified 2K ECC Block disk format of AS-MO (Advanced Storage-Magneto Optical Disk) Physical Specifications (Version1.0 April 1998) is shown.

Referring to FIG. 2, a header 21 is provided before data part 29 and either one of 2T-repeated data in which a bit string "1100" is formed, and 8T-repeated data in which a bit string "1111111100000000" is formed, is recorded. For example, an Auto Read Power Control Area 22 is to be used in order to measure amplitude of the 2T-repeated data and the amplitude of the 8T-repeated data and to adjust reproduction power. An Auto Gain Control Area 23 is used to adjust the amplification gain of a signal. A Read Clock Phase Control Area 24 is used to adjust the phase of the reference clock CLK made by PLL synchronization with the clock mark mentioned above, with the phase of the clock for sampling a data signal. A Buffer Area 25 is provided before the data part 29.

In such general formats including ISO specification or the like, a similar signal is also recorded on an adjoining track. Of course in the data part 29, unknown random data is recorded on the adjacent track.

However, there are problems described as follows in the conventional data reproducing method.

In order to improve an optical disk in high density, bit density and track density may be enlarged. As to improve in high density of bits, a technology such as a PRML (Partial Response Maximum Likelihood) technology using waveform interference is well known. However, if the track density is made high, cross-write and crosstalk occur.

The cross-write is a phenomenon in which when data is recorded on a track to be recorded by higher power than optimal power, the data is also recorded on an adjacent track of the track. The cross-write deletes information currently recorded on the adjacent track. Thus, an information signal quality of the adjacent track is deteriorated. A heat distribution on an optical disk is controlled by properly conducting strobe luminescence and power adjustment of a LD (Laser Diode), so as to avoid the cross-write. Crosstalk is a phenomenon in which the adjacent track signal intermixes in a beam spot when data is reproduced and a jitter is caused in the signal to be reproduced. Especially if the track density becomes higher, the crosstalk cannot be avoided.

The conventional technology (Japanese Laid-Open Patent Application No.58-121138, Japanese Laid-Open Patent Application No.5-205280) is known in which data recorded on the adjacent track is detected, the crosstalk signal is generated from the data, a crosstalk amount is measured, and then the crosstalk is canceled by deducting the crosstalk signal generated from a reproduction signal. In this conventional technology, the adjacent track signal is also simultaneously reproduced by three beams, and the crosstalk is canceled by adjusting and deducting gain. However, since three beams are needed in order to carry out simultaneous reproduction of the adjacent track signal in this conventional technology, it is difficult to adjust phase differences by distance differences among the three beams.

Moreover, in the conventional technology (Laid-Open Patent Application No.5-205280), a reproduction waveform by scanning two tracks including an adjacent track by one beam is sampled by an ADC (Analog to Digital Converter), and a sample value is stored in a storage area, beforehand. The sample value is used and the crosstalk is cancelled when data recorded on a target track is reproduced. However, the ADC, which converts one sample value into 6 bit (through 8 bit) data, is used. The huge storing area, that is, 6 bit (through 8 bit)×sample number (waveform length in which the crosstalk is cancelled)×two tracks, is needed as a storage area.

Furthermore, it is known that the pre-pit signal and the Wobble signal in an area to which address information is stored depend on a diameter of the beam spot. If track density is raised, the pre-pit signal or the Wobble signal is influenced by the adjacent track signal before an MO signal that read data information (such as user data) Consequently, crosstalk data cannot be reproduced. For this reason, in a conventional technology (Laid-Open Patent Application No.8-231139), a method of suppressing interference is proposed in that an adjacent pre-pit signal is shifted in a direction of arranging bits. However, in such a configuration, since an additional area is needed in the direction of arranging bits, a format effect becomes degraded. Even in such a configuration, when the track density is raised further, the crosstalk occurs. That is, in a case in which the track density is raised further, when the beam spot overflows a track, a signal for reproduction is superimposed with an adjacent track signal by the crosstalk. Then, the signal superimposed causes a jitter and a reproduction signal quality is degraded. Accordingly, an error rate of data is increased and the data cannot be reproduced correctly.

SUMMARY OF THE INVENTION

It is a general object of the present invention to provide an apparatus for reproducing recorded data in which the above-mentioned problems are eliminated.

A more specific object of the present invention is to provide the apparatus for reproducing recorded data that generates a crosstalk signal by reproducing an adjacent track while simultaneously reading a target track and at least one adjacent track by one beam, and cancels the crosstalk by deducting the crosstalk signal from the reproduction signal.

The above object of the present invention is achieved by an apparatus for reproducing recorded data by decoding a reproduction signal read from the recorded data recorded on a recording medium in accordance with a predetermined algorithm, the apparatus including: a crosstalk signal generating part generating a crosstalk signal by converting adjacent data recorded on an adjacent track into a waveform of the reproduction signal; and a crosstalk signal eliminating part eliminating the crosstalk signal by deducting from the reproduction signal, wherein the reproduction signal in which the crosstalk signal is eliminated is decoded in accordance with the predetermined algorithm and reproduced.

In the apparatus for reproducing recorded data, it is possible to generate the crosstalk signal from the adjacent rack and eliminate the crosstalk signal, which is generated, from the reproduction signal from the target track to be reproduced.

Accordingly, it is possible to improve the quality of the reproduction signal from recorded data that is recorded on the recording medium where tracks are arranged at high density.

From a viewpoint of eliminating the crosstalk when data information (user data) is reproduced, the apparatus may further include a storing part having at least one memory and storing detected data detected by the predetermined algorithm when the recorded data is user data, wherein the crosstalk signal generating part generates the crosstalk signal by converting the detected data stored in the storing part into the waveform of the reproduction signal, and the reproduction signal showing the user data, in which the crosstalk signal is eliminated by the crosstalk signal eliminating part, is decoded by the predetermined algorithm and reproduced.

In the apparatus according to the present invention, since the detected data detected in accordance with the predetermined algorithm is stored and also the detected data is a bit value, it can be realized to eliminate the crosstalk by less storage area.

Conventionally, 6 bit (through 8 bit) sample data is stored. According to the present invention, only one bit is required to store. It is possible to realize by less storage area (⅛ through ⅙ storage area) than the conventional method. Moreover, since the crosstalk from the adjacent track only is considered by the off-track, it is possible to reduce the storage area to half area. Consequently, it is possible to reduce the storage amount greater than the conventional method (1/16 through 1/12 the storage amount of the conventional method).

From a viewpoint of obtaining a precise crosstalk amount, the apparatus may further include a measurement data recording part recording a predetermined measurement data to measure a crosstalk amount; and an elimination ratio obtaining part obtaining the crosstalk amount based on the measurement data read from the recording medium and obtaining a crosstalk elimination ratio, wherein the crosstalk signal generated by the crosstalk signal generating part is eliminated from the reproduction signal based on the crosstalk elimination ratio.

In the apparatus according to the present invention, it is possible to obtain the precise crosstalk amount by reading the predetermined measurement data recorded on the recording medium. Also, it is possible to variably eliminate the crosstalk signal from the reproduction signal by the crosstalk elimination ratio.

From a viewpoint of realizing a media compatibility, the apparatus may further include a zero data storing part storing zero data only wherein the crosstalk signal generating part obtains the zero data from the zero data storing part when the crosstalk signal is not generated.

In the apparatus according to the present invention, the crosstalk signal is generated based on the zero data. As a result, the crosstalk signal is not generated. Therefore, it is possible to realize the media compatibility for a recording medium where data is recorded by another recording apparatus.

From a viewpoint of generating the crosstalk signal from the reproduction data, the apparatus may further include a read signal converting part converting decoded data into a read signal for reading the recorded data recorded on the recording medium, wherein the storing part stores the decoded data, the read signal converting part converts the decoded data stored by the storing part into the read signal, and the crosstalk signal generating part converts the read signal converted by the read signal converting part into the waveform of the reproduction signal.

In the apparatus according to the present invention, data decoded and output as reproduction data can be converted into the reproduction signal. Therefore, even in a case of using a code, such as a run length limited code, having a longer length after encoded than before encoded, it is possible to eliminate the crosstalk signal from the reproduction signal.

From a viewpoint of generating the crosstalk signal from data in which an error is corrected, the apparatus may further includes a read signal converting part converting corrected data into the read signal for reading the recorded data recorded on the recording medium, wherein the storing part converts the corrected data stored by the storing part into the read signal and the crosstalk signal generating part converts the read signal converted by the read signal converting part into the waveform of the regeneration signal.

In the apparatus, since the crosstalk signal is generated from data in which error is corrected, it is possible to eliminate a more precise crosstalk signal from the reproduction signal.

From a viewpoint of eliminating the crosstalk by reading two tracks, the apparatus may further includes a read controlling part controlling to read the recorded data recorded on a target track to be reproduced by an off-track, wherein the crosstalk signal eliminating part eliminates an actual crosstalk signal caused by the off-track from one side of an adjacent track, by deducting the crosstalk signal generated by the crosstalk signal generating part from the reproduction signal.

In the apparatus, since two track are simultaneously read by the off-track, it is possible to improve an accuracy of the reproduction signal by simply eliminating the crosstalk signal occurring from the adjacent track only.

From a viewpoint of eliminating the crosstalk by reading three tracks, the apparatus may further includes a target reproduction signal storing part storing the reproduction signal read from a target track to be reproduced, wherein: the storing part includes two memories and stores a previous detected data detected from a previous track of the target track and a next detected data detected from a next track of the target track; the crosstalk signal generating part generates a previous crosstalk signal and a next crosstalk signal based on the previous detected data and the next detected data; and the crosstalk signal eliminating part deducts the previous crosstalk signal and the next crosstalk signal from the reproduction signal stored in the target reproduction signal storing part.

In the apparatus, two crosstalk signals are generated from two adjacent tracks by reading three tracks. Therefore, it is possible to improve an accuracy of the reproduction signal more by eliminating the two crosstalk signals from the reproduction signal.

From a viewpoint of eliminating the crosstalk when the address information is reproduced, when the recorded data is address information, the crosstalk signal generating part generates the crosstalk signal by converting adjacent address information adjacent to the recorded data into the waveform of the reproduction signal, so that the reproduction signal showing the address information, in which the crosstalk signal is eliminated by the crosstalk signal eliminating part, is decoded in accordance with the predetermined algorithm to reproduce.

In the apparatus, it is not required to read the adjacent address information. It is possible to generate the crosstalk signal by converting into the waveform of the reproduction signal.

Therefore, without degrading the format effect in the address information area, it is possible to cancel the crosstalk of the address signal. Moreover, higher track density can be realized. Thus, it is possible to improve the recording density by an improved format effect.

BRIEF DESCRIPTION OF THE DRAWINGS

Other objects, features and advantages of the present invention will become more apparent from the following detailed description when read in conjunction with the accompanying drawings, in which:

FIG. 3 is a diagram showing an example of a first format;

FIG. 4A and FIG. 4B are diagrams showing the state of the reproduction signal;

FIGS. 9A, 9B, 9C and 9D are diagrams showing a sequence example of a crosstalk cancel gain when the track jump is conducted;

DESCRIPTION OF THE PREFERRED EMBODIMENTS

Figure 1:
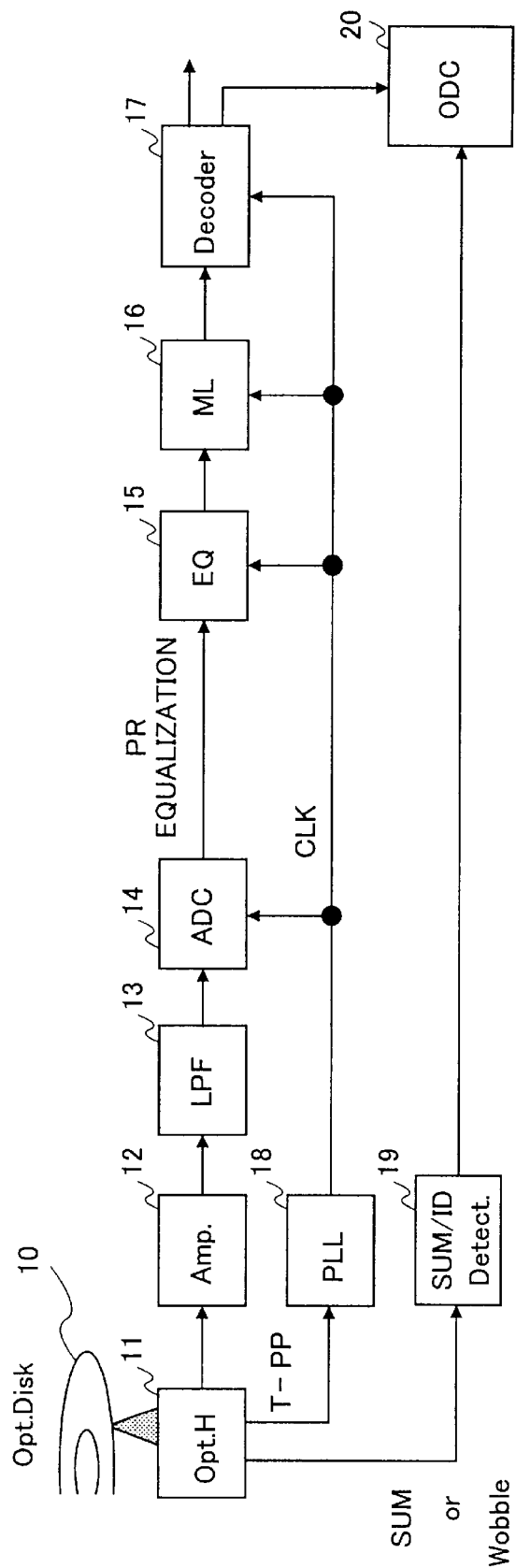
FIG. 1 is a diagram showing an example of a circuit configuration of a conventional data reproducing apparatus.

An embodiment according to the present invention will now be described with reference to the figures.

In a data reproducing apparatus according to the embodiment of the present invention, for example, data is recorded on a recording medium in accordance with a first format as shown in FIG. 3.

FIG. 3 is a diagram showing an example of the first format.

In FIG. 3, a predetermined signal, for example, an area 41 recording 2T-repeated data is arranged so as to shift every track for two tracks in a measurement area of crosstalk. A blank area 42 is an area where no data is recorded. Moreover, a data part 29 is shown such as Data 2n−1, Data 2n, and Data 2(n+1)−1 every track.

In the first format shown in FIG. 3, an optical beam simultaneously irradiates two tracks T2n−1 and T2n such as a spot 40. Like the spot 40, a state of a reproduction signal reproducing recorded data (data such as user data recorded on a recording medium 10) by emitting an optical beam (not shown) is shown in FIG. 4A and FIG. 4B.

FIG. 4A and FIG. 4B are diagrams showing the state of the reproduction signal.

In FIG. 4A, if an ideal reproduction is conducted so that no crosstalk occurs at tracks T2n−1 and T2n of the first format, the reproduction signal occurs in the area 41 of the 2T-repeated data and the data part 29 at each of the tracks T2n−1 and T2n but does not occur other than in the tracks T2n−1 and T2n.

However, for example, in a case in which the track T2n is reproduced, since the crosstalk occurs by the reproduction signal from the adjacent track T2n−1, the reproduction signal from the track T2n includes the crosstalk as shown in FIG. 4B.

In FIG. 4B, if the track T2n is to be reproduced and a signal amplitude $V_A$ is of the track T2n, the crosstalk signal from the adjacent track T2n−1 is reproduced such as a signal $XT_A$ and the crosstalk signal has the signal amplitude $V_A$ depending on a crosstalk amount.

In the present invention, as shown in FIG. 4B, gate signals Gate A and Gate B are created, the crosstalk amount of each of the gate signals Gate A and Gate B is measured, and signal amplitudes $V_A$ and $V_B$ are measured.

Figure 2:
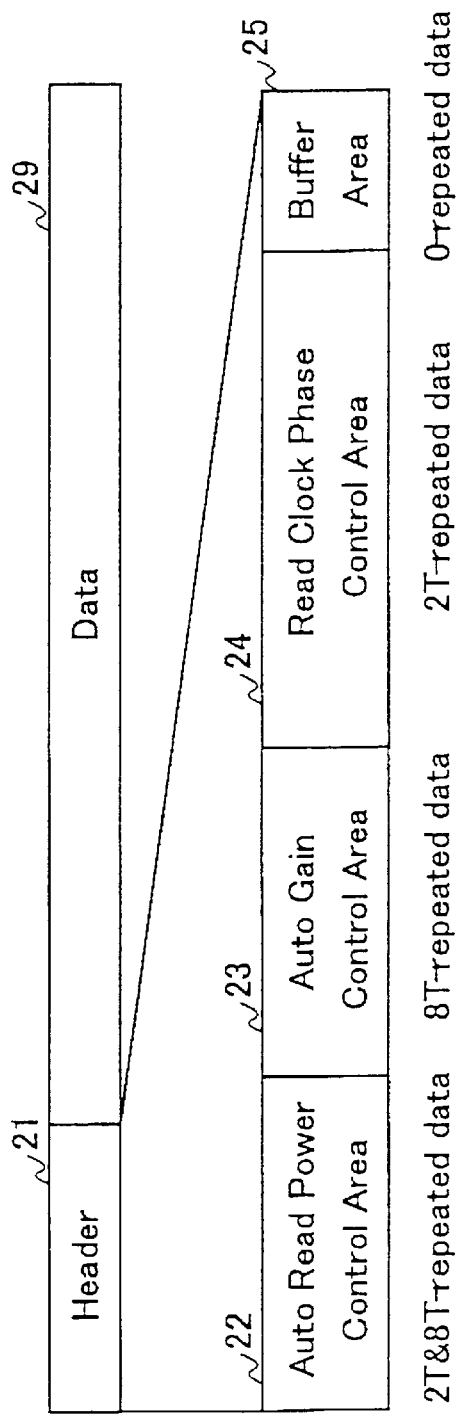
FIG. 2 is a schematic diagram showing an example of a format.
Figure 5:
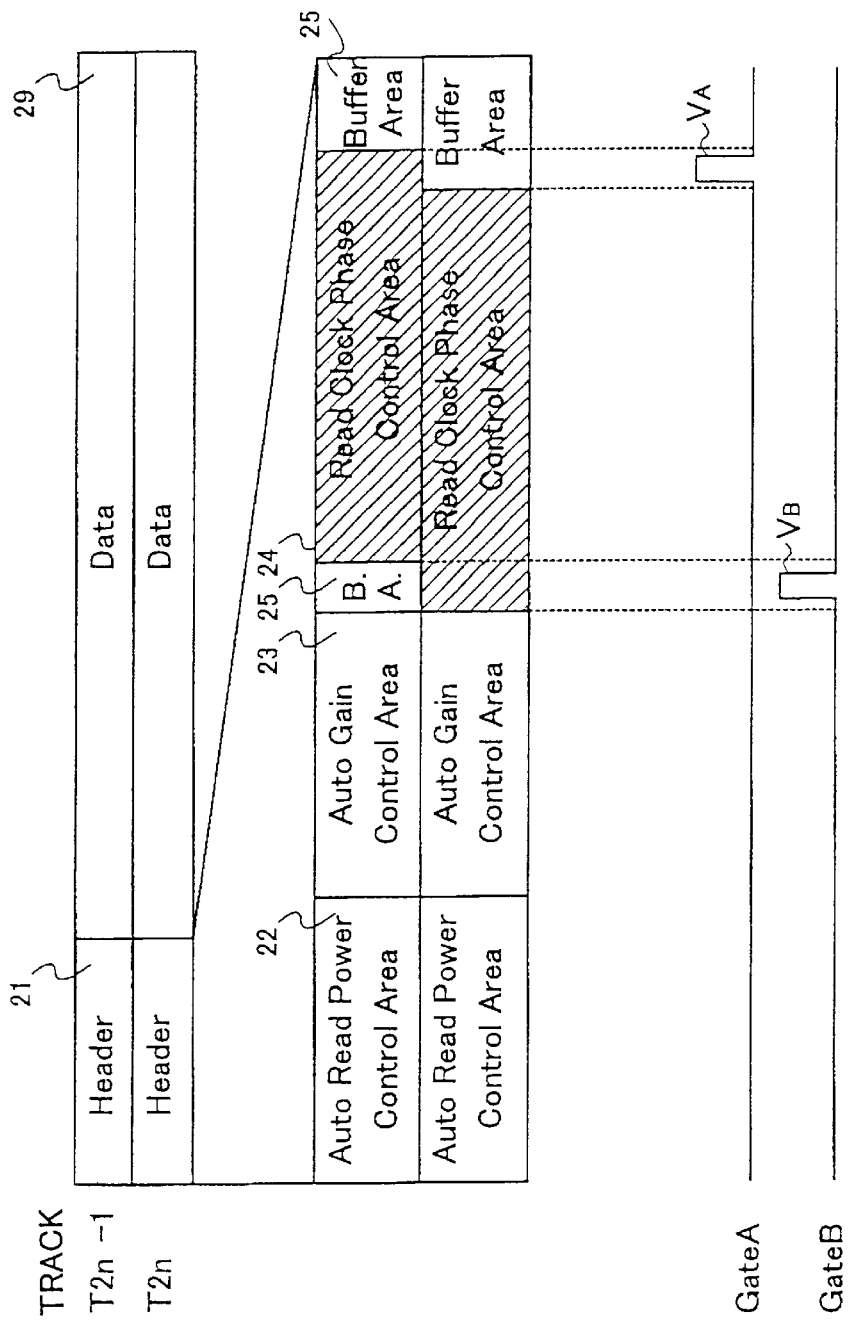
FIG. 5 is a diagram showing an example of the second format.

In a case in which the example of the conventional format shown in FIG. 2 is applied to the first format shown in FIG. 3, in accordance with which first format the data reproducing apparatus records data, according to the embodiment of the present invention, for example, a conventional existing area can be configured as a measurement area such as a second format shown in FIG. 5.

FIG. 5 is a diagram showing an example of the second format.

Referring to FIG. 5, by changing the position and capacity of an area (Buffer Area) 25, a Read Clock Phase Control Area 24 is arranged so as to shift for every track. By forming a stagger, areas for obtaining crosstalk gain are provided. In the example of the second format of FIG. 5, the Read Clock Phase Control Area 24 is used as a measurement area of the crosstalk.

Figure 6:
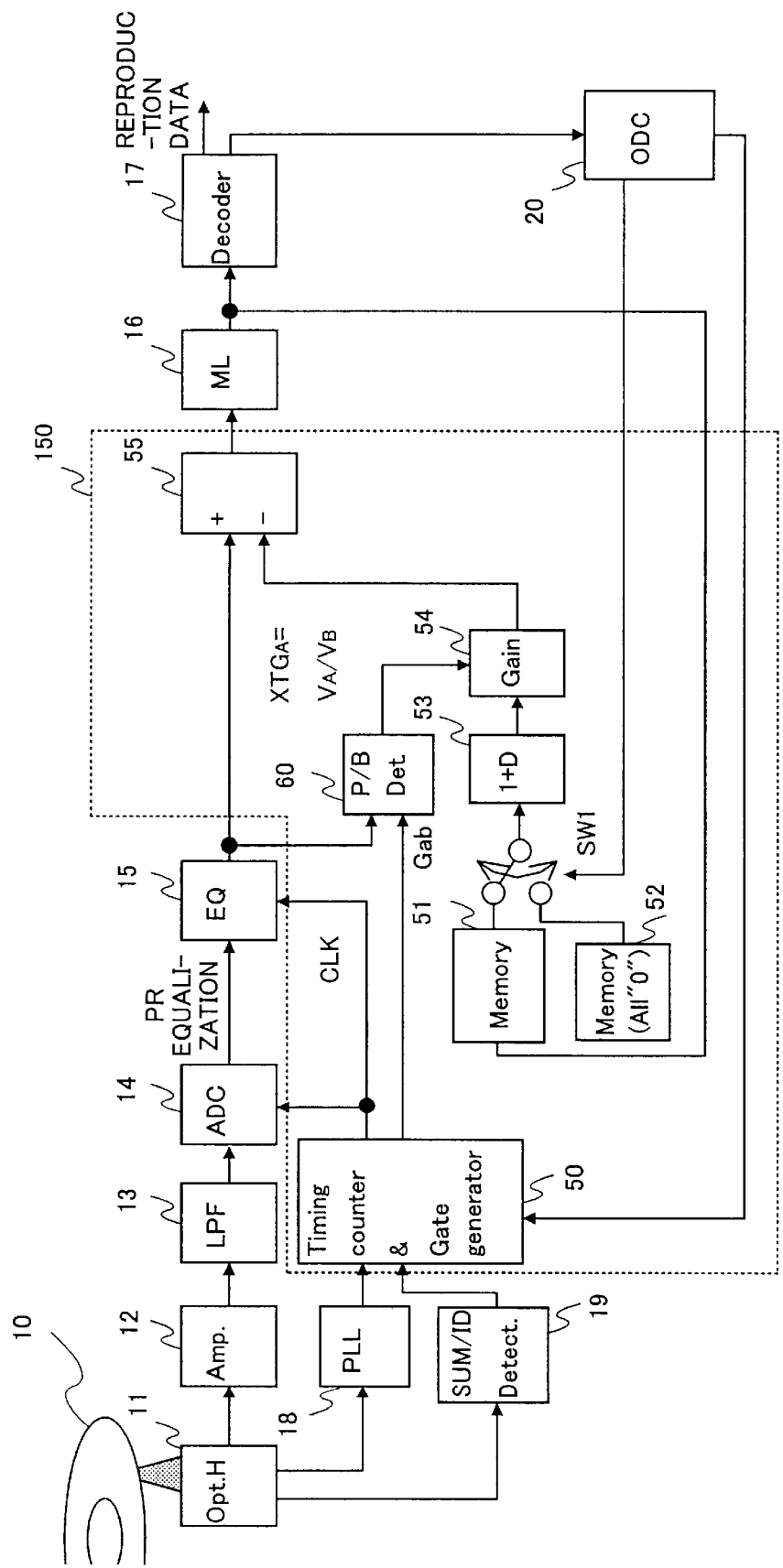
FIG. 6 is a diagram showing a configuration example of a first reproduction circuit.

With reference to FIG. 6, a reproduction circuit will now be described in that the crosstalk is cancelled while reproducing data recorded in accordance with the first format or the second format where the stagger is formed.

FIG. 6 is a diagram showing a configuration example of a first reproduction circuit. In FIG. 6, a portion 150 surrounded by a dotted line shows a characteristic configuration in the first reproduction circuit. In FIG. 6, the first reproduction circuit includes an optical head 11 for reading recorded data from the recording medium 10, an amplifier 12 for amplifying a reproduction signal, a LPF (low pass filter) 13 for eliminating a high frequency noise, an ADC (A/D converter) 14 for converting the reproduction signal into digital data, a EQ (digital equalizer) 15 for equalizing to a predetermined waveform, a calculator 55 for deducting the crosstalk from the reproduction signal, a ML (most-likelihood) detector 16 for detecting data based on a most-likelihood, a decoder 17 for decoding data and outputting reproduction data, a PLL (Phase Locked Loop) 18 for conducting a phase comparison, a SUM/ID detector 19 for detecting address information, a timing counter and gate generator 50 for generating the timing and the gate signal to sample, a memory 51 for storing detected data, a memory 52 for storing "0 (zero)" data only, a 1+D circuit 53 for generating a PR(1,1) waveform, a gain adjusting circuit 54 for adjusting crosstalk gain, a P/B (peak/bottom) detector 60 for detecting the peak and bottom of sample data, and the ODC (optical disk controller) 20 for controlling the first reproduction circuit.

The reproduction signal in which the optical head 11 reads recorded data on the recording medium 10 is amplified by amplifier 12 and a high frequency noise is eliminated by the LPF 13. Then, the reproduction signal is supplied to the ADC 14.

Based on a reference clock CLK supplied from the PLL 18, the reproduction signal is sampled by the ADC 14 in response to a timing supplied by the timing counter and gate generator 50. Sampled data obtained by sampling the reproduction signal is equalized into a predetermined PR (Partial Response) by the EQ 15.

On the other hand, in order to recognize an address on which information is recorded, the SUM/ID detector 19 detects the address information by a SUM signal or a Wobble signal. Based on detected address information, gate signal generated by the timing counter and gate generator 50 is supplied to the P/B detector 60.

The P/B detector 60 obtains differences between peak values and bottom values as signal amplitudes $V_A$ and $V_B$, respectively, in response to the gate signals Gate A and Gate B supplied from the timing counter and gate generator 50. The P/B detector 60 obtains a crosstalk gain $XTG_A$ (=$V_A/V_B$) showing an elimination ratio to the crosstalk amount based on the signal amplitudes $V_A$ and $V_B$ obtained, and then supplies to the gain adjusting circuit 54.

The calculator 55 deducts the crosstalk gain $XTG_A$ adjusted by the gain adjusting circuit 54 from the sample value that is equalized into the PR waveform by the EQ 15. Then, the crosstalk is cancelled.

For the reproduction signal in which the crosstalk is canceled, a most likelihood is detected by the ML detector 16 and data is detected based on the detected most likelihood. Then, the decoder 17 decodes the data.

When the ODC 20 conducts a crosstalk cancellation, the ODC 20 switches a switch SW1 to the memory 51 in which the detected data of a previous track is stored. On the other hand, when the crosstalk cancellation is conducted to realize a medium compatibility or the crosstalk cancellation is not required because of a small amount of the crosstalk, the switch SW1 is switched to the memory 52 in which only "0" is stored.

In a case in which a predetermined PR waveform, for example, a PR(1,1) waveform is synthesized from the detected data of the adjacent track stored in the memory 51, a 1+D operation (D indicates a delay for one clock) is conducted by the 1+D circuit 53 and then an ideal PR waveform for the detected data is produced.

For example, when the data recorded on the data part 29 of the track T2n is decoded, first, the detected data, in which the data reproduction is conducted, of the data part 29 of the track T2n−1 is stored in memory 51.

Furthermore, when the target track T2n is reproduced, when the target track T2n is reproduced, the calculator 55 deducts the crosstalk gain $XTG_A$ in which the gain adjustment is conducted, from the reproduction signal and then the crosstalk is cancelled. The reproduction signal of the track T2n, in which the crosstalk is canceled, is output as the reproduction data through the ML detector 16 and the decoder 17. Moreover, the detected data, which is detected by the ML detector 16, of the track T2n is stored in the memory 51 and the detected data is used to cancel the crosstalk for the reproduction signal of a next track.

Since the detected data detected by the ML detector 16 is stored in memory 51 every one bit, the crosstalk cancellation can be realized in a smaller amount of memory than a case where the equalized sample value is stored.

Figure 7:
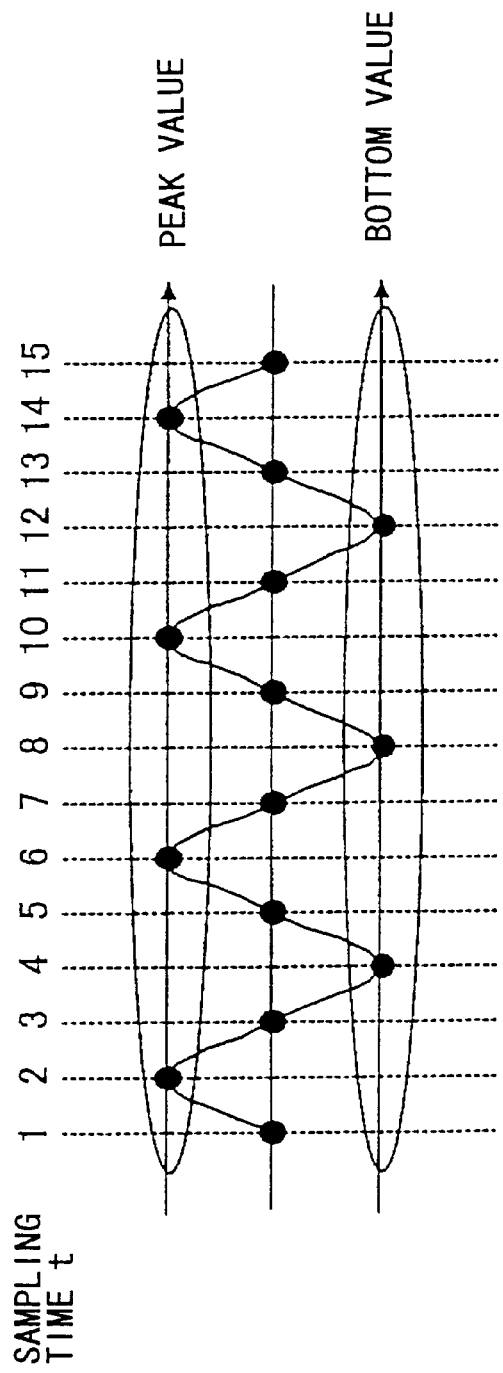
FIG. 7 is a diagram showing a sampling example of the PR(1,1) waveform.

The peak value and the bottom value are detected by the P/B detector 60 at timing as shown in FIG. 7.

FIG. 7 is a diagram showing a sampling example of the PR(1,1) waveform.

Referring to FIG. 7, the peak values and the bottom values are sampled at predetermined locations (at predetermined times) by using the predetermined pattern. That is, the peak values are sampled at the predetermined sampling times t=2, 6, 10, and 14, and the bottom values are sampled at the predetermined sampling times t=4, 8 and 12.

Figure 8:
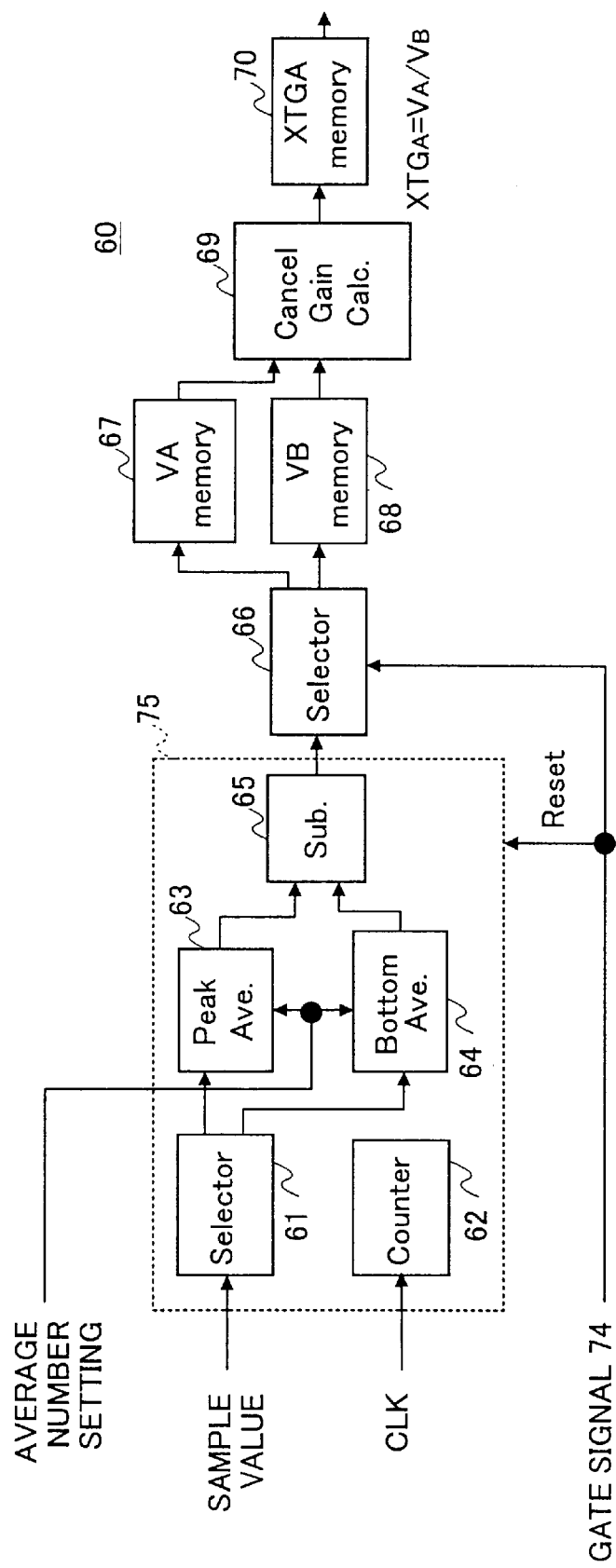
FIG. 8 is a diagram showing an example of the circuit configuration of the peak bottom detector.

Moreover, in order to sample as shown in FIG. 7, the P/B detector 60 is configured as shown in FIG. 8

FIG. 8 is a diagram showing an example of the circuit configuration of the peak bottom detector.

In FIG. 8, the P/B detector 60 includes a peak bottom difference calculating circuit 75, a selector 66 for switching a $V_A$ memory 67 and a $V_B$ memory 68 in response to a gate signal 74, the $V_A$ memory 67 for storing the signal amplitude $V_A$, the $V_B$ memory 68 for storing the signal amplitude $V_B$, a cancel gain calculating circuit 69 for calculating crosstalk gain $XTG_A$, and a $XTG_A$ memory 70 for storing crosstalk gain $XTG_A$.

Furthermore, the peak bottom difference calculating circuit 75 includes a selector 61 for distributing the sample value, a counter 62 for counting the predetermined time t, a peak value averaging circuit 63 for calculating an average of the peak value, a bottom value averaging circuit 64 for calculating an average of the bottom value, and an average subtracting circuit 65 for calculating a difference between averages of the peak value and the bottom value.

In the peak bottom difference calculating circuit 75, based on the clock CLK supplied from the timing counter and gate generator 50 of FIG. 6, the counter 62 counts a predetermined number and notifies the selector 61 of the timing for distributing the peak value or the bottom value. In response to the timing notified by the counter 62, the selector 61 distributes the sample value supplied from the EQ 15 to the peak value averaging circuit 63 calculating the average of the peak value, or the bottom value averaging circuit 64 calculating the average of the bottom value.

The peak value averaging circuit 63 calculates the average of the peak value. Moreover, based on an average number set from the outside, the average of the peak value, in which a difference in a length of the predetermined pattern and a difference in a signal quality are adjusted, is supplied to the average subtracting circuit 65.

The bottom value averaging circuit 64 calculates average of the bottom value. Moreover, based on an average number set from the outside, the average of the bottom value, in which a difference in the length of the predetermined pattern and the difference in the signal quality are adjusted, is supplied to the average subtracting circuit 65.

Based on the average obtained from each of the peak value averaging circuit 63 and the bottom value averaging circuit 64, the average subtracting circuit 65 calculates the average difference of peak value and a bottom value.

In response to the gate signal 74, the selector 66 distributes the average difference from the peak bottom difference calculating circuit 75 as the signal amplitudes $V_A$ or $V_B$ to the $V_A$ memory 67 or the $V_B$ memory 68.

The cancel gain calculating circuit 69 obtains the signal amplitudes $V_A$ and $V_B$ from the $V_A$ memory 67 and the $V_B$ memory 68, calculates the crosstalk gain $XTG_A$ (=$V_A/V_B$), and stores in $XTG_A$ memory 70.

Therefore, by the gain adjusting circuit 54 of FIG. 6, the crosstalk gain $XTG_A$, in which the gain adjustment is conducted for the PR signal, is deducted, and then the crosstalk is canceled.

In the above-desecribed method for canceling the crosstalk, two tracks are reproduced by one beam simultaneously; that is, an off-track operation is conducted. Accordingly, it is required to avoid a tracking error when a track jump is conducted.

As a method for avoiding the tracking error caused by the off-track when the track jump is conducted, for example, as shown in FIG. 9, the track jump is conducted at on-track and then is gradually positioned at off-track.

FIGS. 9A, 9B, 9C, and 9D are diagrams showing a sequence example of the crosstalk cancel gain when the track jump is conducted.

Referring to FIG. 9A, in a case of the track jump, at a track T2(n−1)−1 being one or more tracks inner side (or outer side), the optical beam is positioned at a spot 90 at on-track by a kickback and the recorded data is reproduced. At the kickback, the crosstalk cancel gain is set as "0 (zero)." That is, the memory 52 is selected by the ODC 20 shown in FIG. 6.

In FIG. 9B, immediately after the track jump, the spot 90 is in the state of the on-track at the track T2n−1, and then the spot 90 is gradually positioned to the off-track toward a track T2(n+1)−1.

In a state immediately after the track jump in FIG. 9B, the spot 90 is still at the on-track. Thus, the crosstalk cancel gain still indicates "0 (zero)". Also, an offset for the tracking error signal (TES) is "0 (zero)".

The offset is determined using the tracking error signals at the kickback and immediately after the track jump.

Referring to FIG. 9C, in a case in which a next track T2n is reproduced while approaching toward a target track T2(n+1)−1, the offset determined for the tracking error signal is conducted, and the crosstalk cancel gain is defined, for example, as "0.5".

Referring to FIG. 9D, in a case in which the target track T2(n+1)−1 is successively reproduced, similarly to the case of reproducing the track T2n, the offset determined for the tracking error signal is conducted, and the crosstalk cancel gain is defined, for example, as "1".

Thus, the crosstalk cancel gain is gradually magnified toward the target track T2(n+1)−1, and the crosstalk cancel gain is magnified more as the accuracy of reproduction data becomes higher. An off-track amount is also magnified gradually. Therefore, it is possible to avoid conducting the crosstalk cancellation to the detected data at the track jump of an earlier stage in which many data errors occur. As described above, in the crosstalk cancellation according to the embodiment of the present invention, it is possible to avoid conducting the data reproduction that accelerates a data error.

Figure 10:
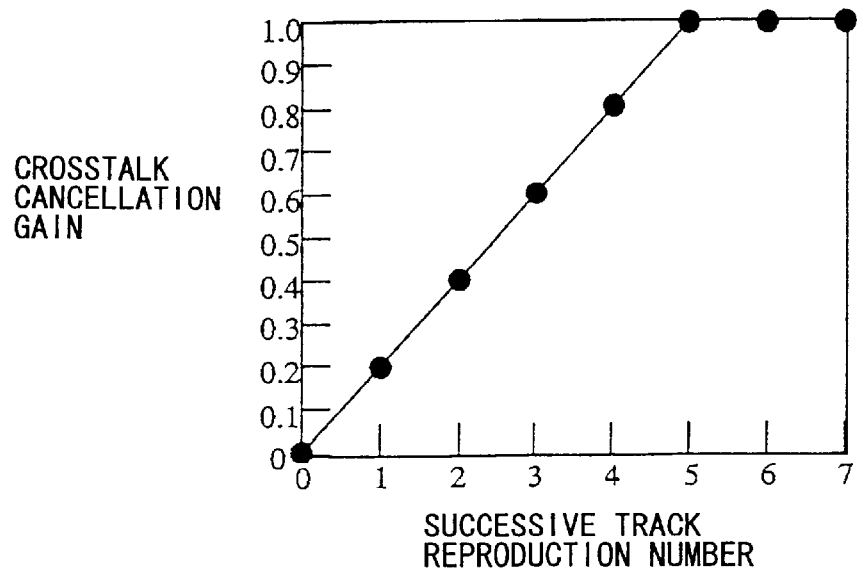
FIG. 10 is a diagram showing a relationship between a successive track reproduction number and the crosstalk cancel gain.

FIG. 10 is a diagram showing a relationship between a successive track reproduction number, and the crosstalk cancel gain.

As appreciated from FIG. 10, the crosstalk cancel gain is gradually increasing from "0 (zero)" until the successive track reproduction number becomes five and the crosstalk cancel gain becomes "1" where the successive track reproduction number is more than five.

Thus, after the crosstalk cancel gain becomes "1", the crosstalk cancel gain remains "1".

A method for improving a reproduction process in speed will now be described in which a memory is provided to each sector.

Figure 11:
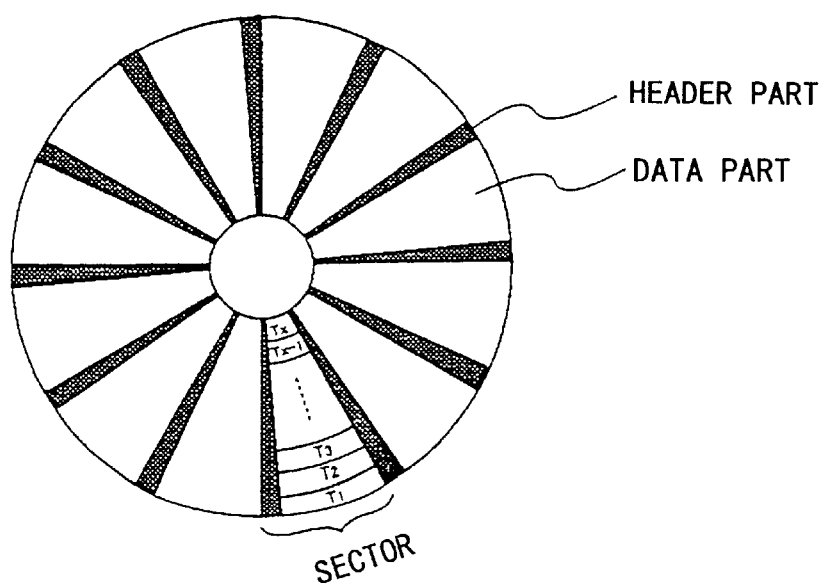
FIG. 11 is a diagram showing an optical hard disk format.

FIG. 11 is a diagram showing an optical hard disk format.

A CAV (Constant Angular Velocity) disk such as shown in FIG. 11 includes twelve sectors, each of which has a header part and a data part, on each track.

Figure 12:
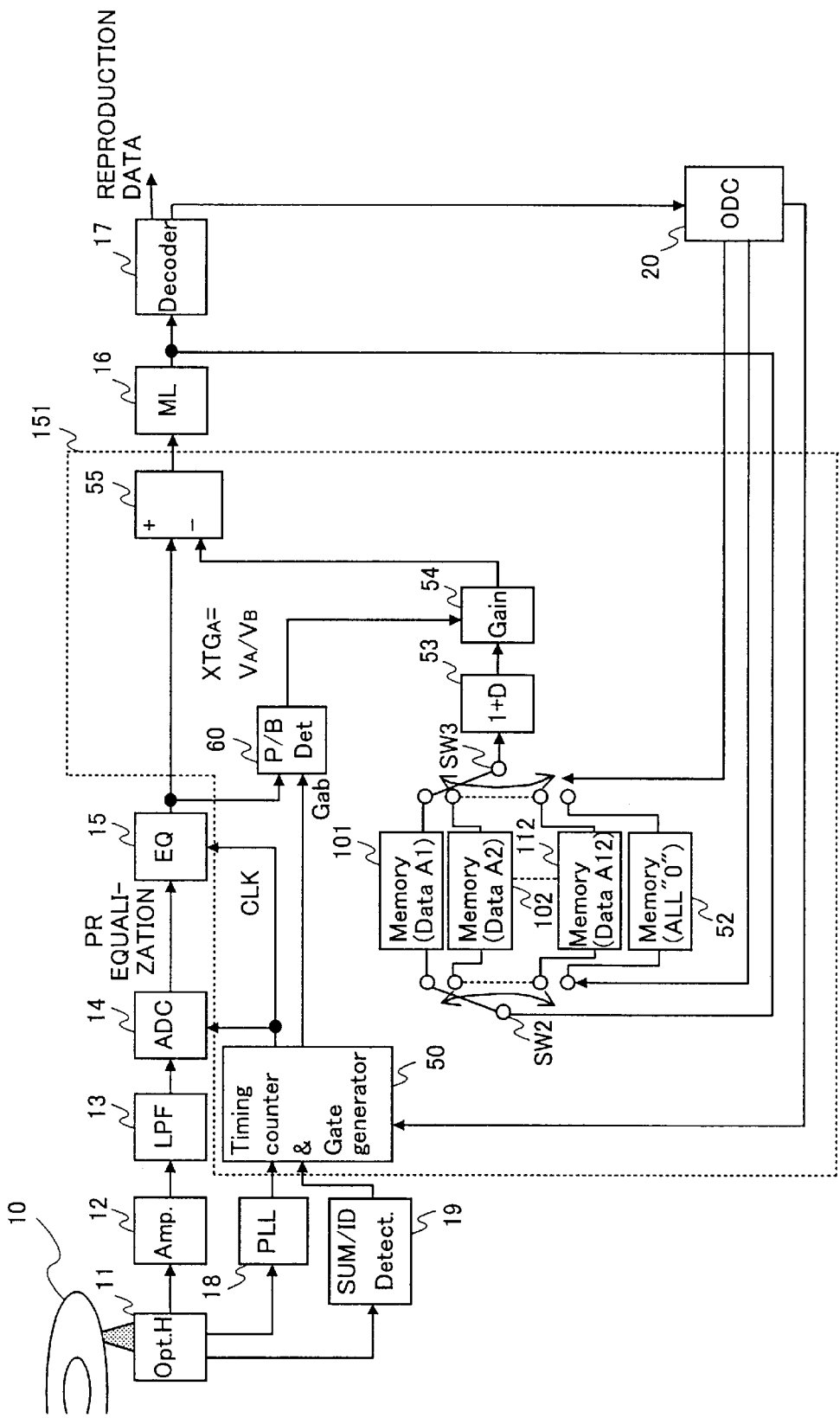
FIG. 12 is a diagram showing a configuration example of the second reproduction circuit.

For example, a second reproduction circuit, which corresponds to a format of the CAV disk and realizes higher speed, can be configured as shown in FIG. 12.

In a case of an MCAV, the crosstalk signal memory is provided only for each of outer tracks having a greater number of sectors than inner tracks.

FIG. 12 is a diagram showing a configuration example of the second reproduction circuit. In FIG. 12, circuits that are the same as the ones in FIG. 6 are indicated by the same reference numerals and the explanation thereof will be omitted. Moreover, a portion 151 surrounded by a dotted line shows a characteristic configuration in the second reproduction circuit.

Referring to FIG. 12, the second reproduction circuit includes the optical head 11 for reading recorded data in the recording medium 10, the amplifier 12 for amplifying the reproduction signal, the LPF 13 for eliminating high frequency noise, the ADC 14 for converting the reproduction signal into digital data, the EQ 15 for equalizing to a predetermined waveform, the calculator 55 for deducting the crosstalk from the reproduction signal, the ML detector 16 for detecting data based on the degree, the decoder 17 for decoding data and outputting reproduction data, the PLL (Phase Locked Loop) 18 for conducting a phase comparison, the SUM/ID detector 19 for detecting address information, the timing counter and gate generator 50 for generating the timing and the gate signal to sample, memories 101 through 112 for storing detected data, the memory 52 for storing "0 (zero)" data only, the 1+D circuit 53 for generating the PR(1,1) waveform, the gain adjusting circuit 54 for adjusting crosstalk gain, the P/B (peak/bottom) detector 60 for detecting the peak and bottom of sample data, and the ODC (optical disk controller) 20 for controlling the second reproduction circuit.

In the second reproduction circuit shown in FIG. 12, instead of the memory 51 shown in FIG. 6, the memories 101 through 112 are provided for twelve sectors of one track, the ODC 20 controls switches SW2 and SW3 and switches to one of the memories.

The detected data detected from each sector is stored in each of the memories 101 through 112, and the detected data is used to cancel the crosstalk. The same method for canceling crostalk as that of the first reproduction circuit shown in FIG. 6 can be applied.

Thus, it is possible to conduct the reproduction process for a plurality of tracks in a shorter time.

Figure 13:
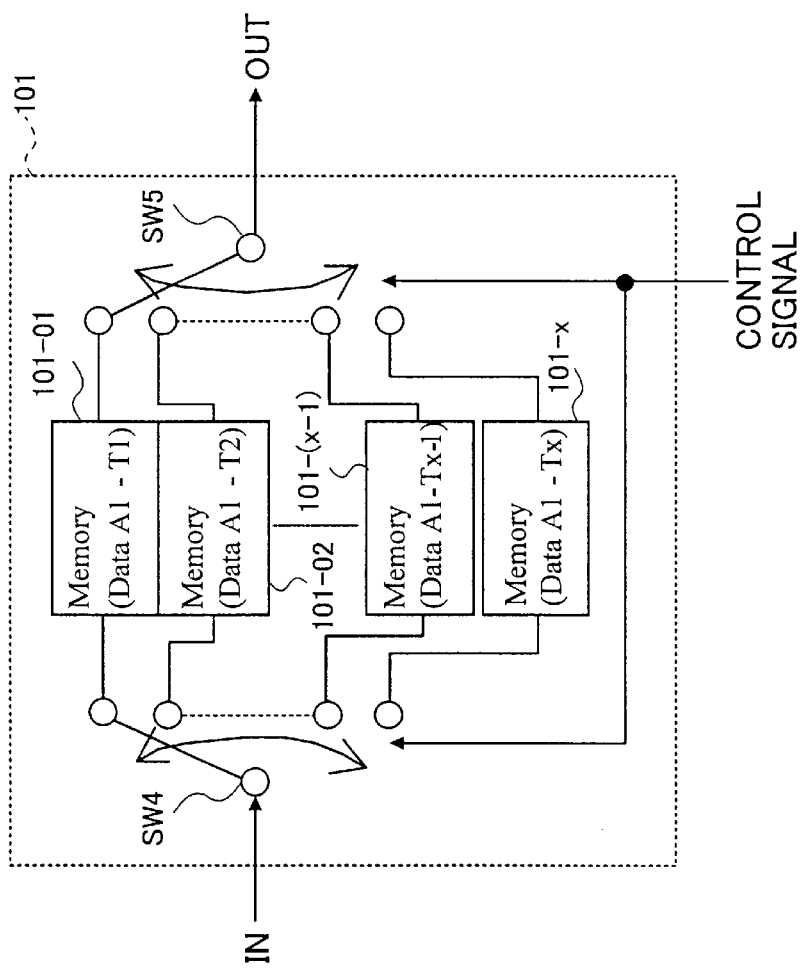
FIG. 13 is a diagram showing a memory configuration example inside the single memory for each sector.

Moreover, in a case in which a plurality of memories are provided for all tracks for each sector, for example, as shown in FIG. 13, the same number of memories as the number of tracks are further provided in a single memory for each sector.

FIG. 13 is a diagram showing a memory configuration example inside the single memory for each sector.

Referring to FIG. 13, for example, the memory 101 shown in FIG. 12 includes a set of memories 101-01, 101-02, . . . , 101-(x−1), 101-x corresponding to tracks T1 through Tx, respectively. Switches SW4 and SW5 are controlled by the ODC 20 and then one of the memories 101-01, 101-02, . . . , 101-(x−1), 101-x is switched.

Thus, it is possible to conduct the reproduction process at higher speed by providing the memories 101-01, 101-02, . . . , 101-(x−1), 101-x in a track direction (a radius direction).

Since the detected data detected by the ML detector 16 are stored in the memories shown in FIG. 12 and FIG. 13, it is possible to reduce a memory amount less than a case of storing the sample values for each sector or each track.

Figure 14:
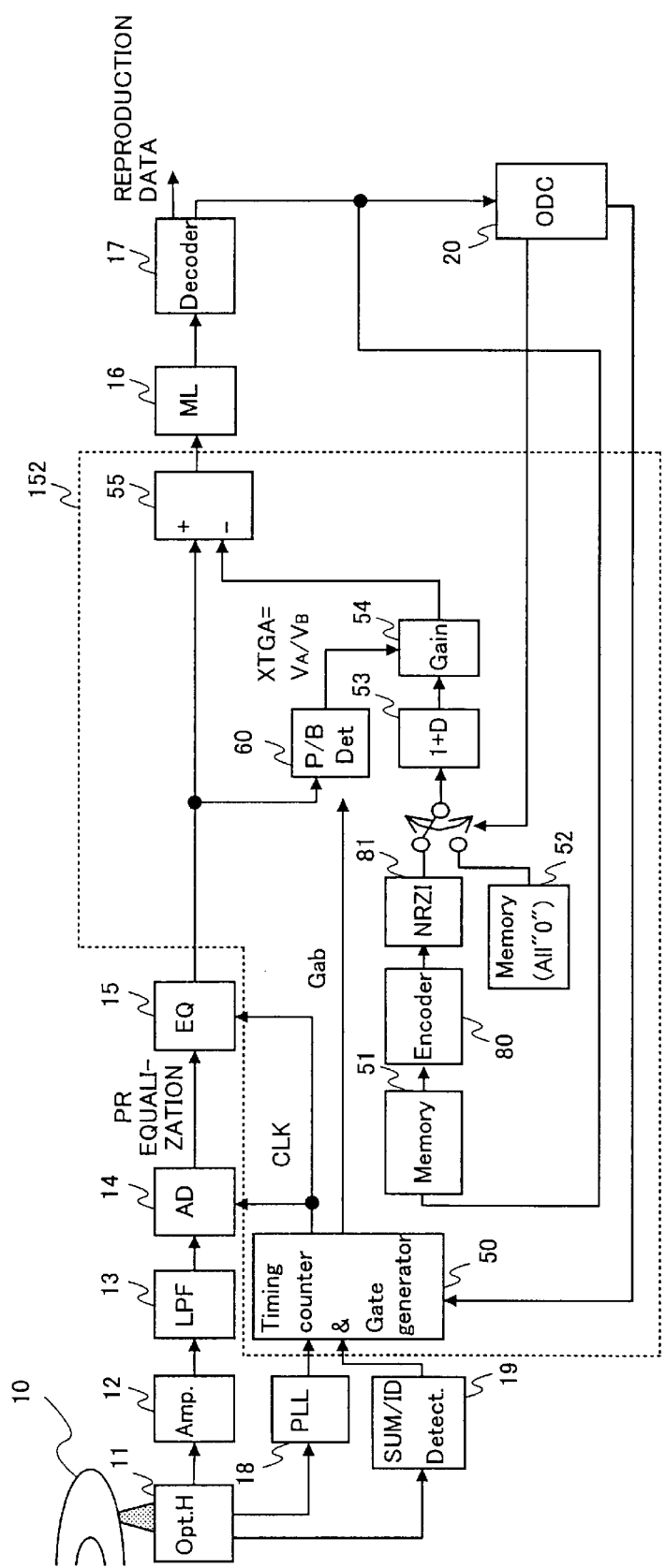
FIG. 14 is a diagram showing a configuration example of the third reproduction circuit.

For example, in a case of using a code having a longer length after encoded than before encoded such as a run length limited code, for example, (1,7)RLLC, (2,7)RLLC or a like, a third reproduction circuit is configured as shown in FIG. 14, so as to cancel the crosstalk.

FIG. 14 is a diagram showing a configuration example of the third reproduction circuit. In FIG. 14, circuits that are the same as the ones in FIG. 6 are indicated by the same reference numerals and the explanation thereof will be omitted. Moreover, a portion 152 surrounded by a dotted line shows a characteristic configuration in the third reproduction circuit.

Referring to FIG. 14, the third reproduction circuit includes the optical head 11 for reading recorded data in the recording medium 10, the amplifier 12 for amplifying the reproduction signal, the LPF (low pass filter) 13 for eliminating high frequency noise, the ADC (A/D converter) 14 for converting the reproduction signal into digital data, the EQ 15 for equalizing to a predetermined waveform, the calculator 55 for deducting the crosstalk from the reproduction signal, the ML detector 16 for detecting data based on a most-likelihood, the decoder 17 for decoding data and outputting reproduction data, the PLL (Phase Locked Loop) 18 for conducting a phase comparison, the SUM/ID detector 19 for detecting address information, the timing counter and gate generator 50 for generating the timing and the gate signal to sample, an encoder 80 for encoding decoded data, a NRZ1 (Non-Return-to-Zero) circuit 81 for converting into a LD (laser diode) drive signal, the memory 52 for storing "0 (zero)" data only, the 1+D circuit 53 for generating the PR(1,1) waveform, the gain adjusting circuit 54 for adjusting crosstalk gain, the P/B (peak/bottom) detector 60 for detecting the peak and bottom of sample data, and the ODC (optical disk controller) 20 for controlling third reproduction circuit.

In the third reproduction circuit shown in FIG. 14, in order to correspond to data to be sampled, the encoder 80 for encoding decoded data, and the NRZ1 circuit 81 for changing decoded data into a LD drive signal are provided to produce the crosstalk waveform.

Therefore, even in a case of using decoded data having a shorter data length than the sample data of the reproduction signal, it is possible to realize a smaller memory amount and to cancel the crosstalk.

Figure 15:
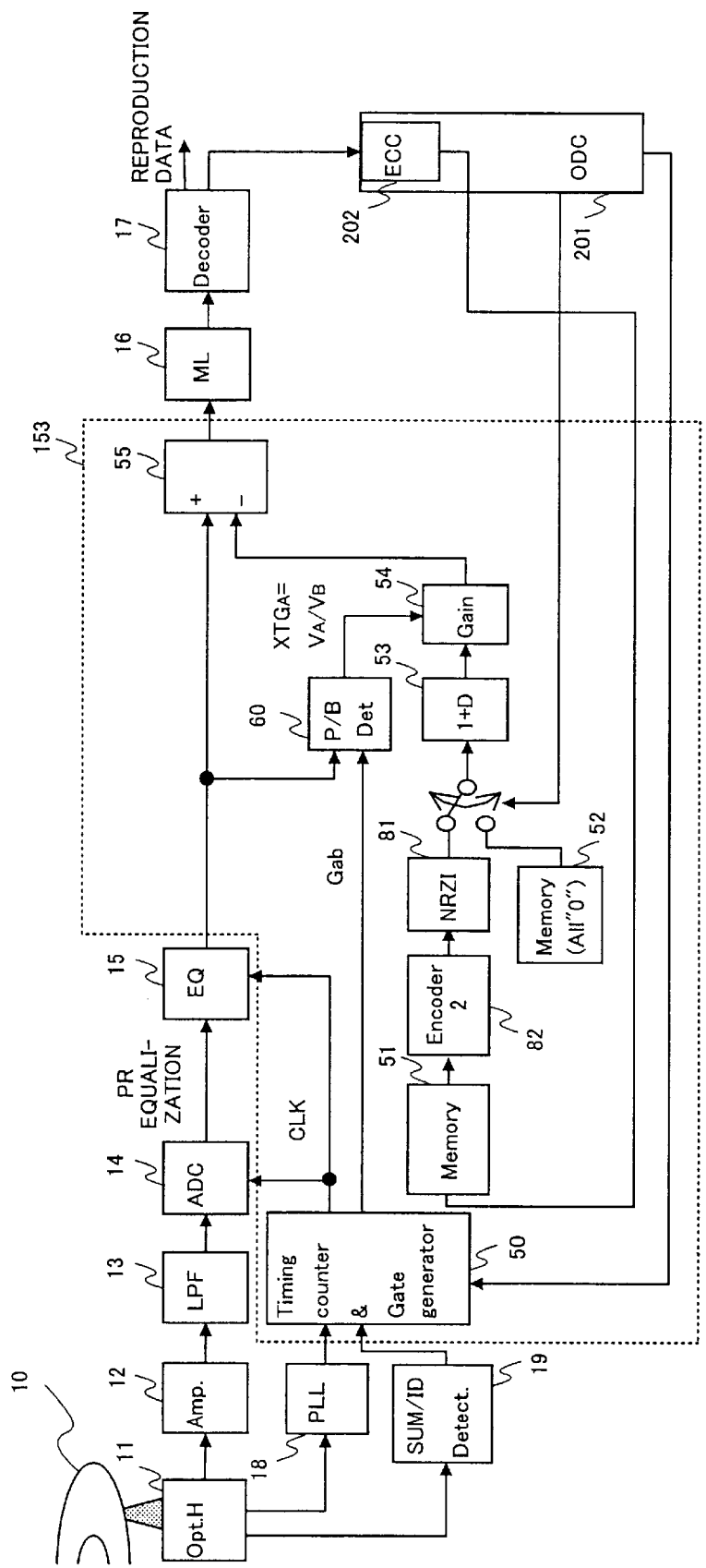
FIG. 15 is a diagram showing a configuration example of the fourth reproduction circuit.

Moreover, in a case in which corrected data, which an error of data is corrected by an ECC (Error Correcting Code), is stored in the memory 51, a fourth reproduction circuit is configured shown in FIG. 15, so that the crosstalk can be cancelled.

FIG. 15 is a diagram showing a configuration example of the fourth reproduction circuit. In FIG. 15, circuits that are the same as the ones in FIG. 14 are indicated by the same reference numerals and the explanation thereof will be omitted. Moreover, a portion 153 surrounded by a dotted line shows a characteristic configuration in the fourth reproduction circuit.

Referring to FIG. 15, the fourth reproduction circuit includes the optical head 11 for reading recorded data in the recording medium 10, the amplifier 12 for amplifying the reproduction signal, the LPF (low pass filter) 13 for eliminating high frequency noise, the ADC 14 for converting the reproduction signal into digital data, the EQ 15 for equalizing to a predetermined waveform, the calculator 55 for deducting the crosstalk from the reproduction signal, the ML detector 16 for detecting data based on a most-likelihood, the decoder 17 for decoding data and outputting reproduction data, the PLL (Phase Locked Loop) 18 for conducting a phase comparison, the SUM/ID detector 19 for detecting address information, the timing counter and gate generator 50 for generating the timing and the gate signal to sample, an encoder 82 for encoding decoded data including the ECC, a NRZ1 (Non-Return-to-Zero) circuit 81 for converting into the LD (laser diode) drive signal, the 1+D circuit 53 for generating the PR(1,1) waveform, the gain adjusting circuit 54 for adjusting the crosstalk gain, the P/B (peak/bottom) detector 60 for detecting the peak and bottom of the sample data, and an ODC (optical disk controller) 201 for controlling the fourth reproduction circuit. The ODC 201 further includes an ECC 202.

In the fourth reproduction circuit shown in FIG. 15, corrected data, in which an error is corrected by the ECC 202, is stored in the memory 51. After that, the same reproduction process as the third reproduction circuit shown in FIG. 14 is conducted. Thus, it is possible to cancel the crosstalk from the reproduction signal.

Since the corrected data, in which the error is corrected by the ECC 202, is stored in the memory 51, it is possible to avoid including an error in the crosstalk signal produced.

A third format in a case of producing the crosstalk signal using three tracks will now be described.

Figure 16:
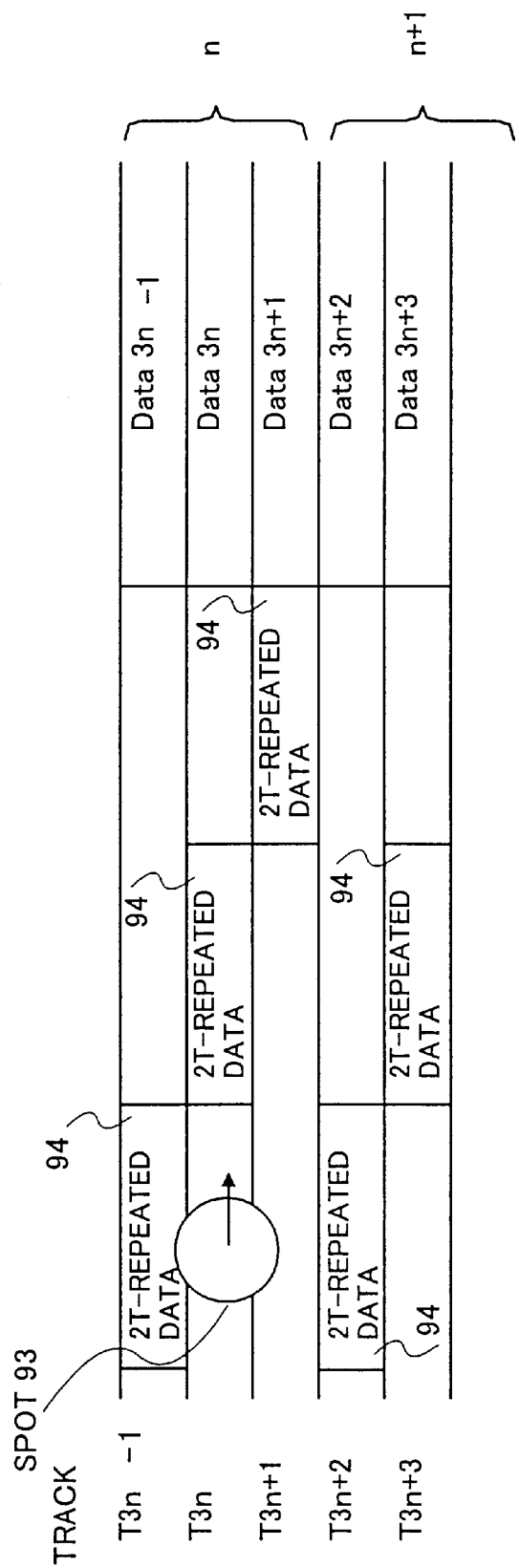
FIG. 16 is a diagram showing an example of the third format.

FIG. 16 is a diagram showing an example of the third format.

Referring to FIG. 16, such as the first format shown in FIG. 3, the predetermined signal, for example, 2T-repeated data 94 is shifted in the measuring area for measuring the crosstalk for each track in three tracks so as to form a stagger. In the third format shown in FIG. 16, one beam irradiates simultaneously three tracks T3n−1, T3n, and T3n+1 like a spot 93.

A fifth reproduction circuit, in which the crosstalk is cancelled while data recorded in accordance with the third format forming the stagger as shown in FIG. 16, will now be described with reference to FIG. 17.

Figure 17:
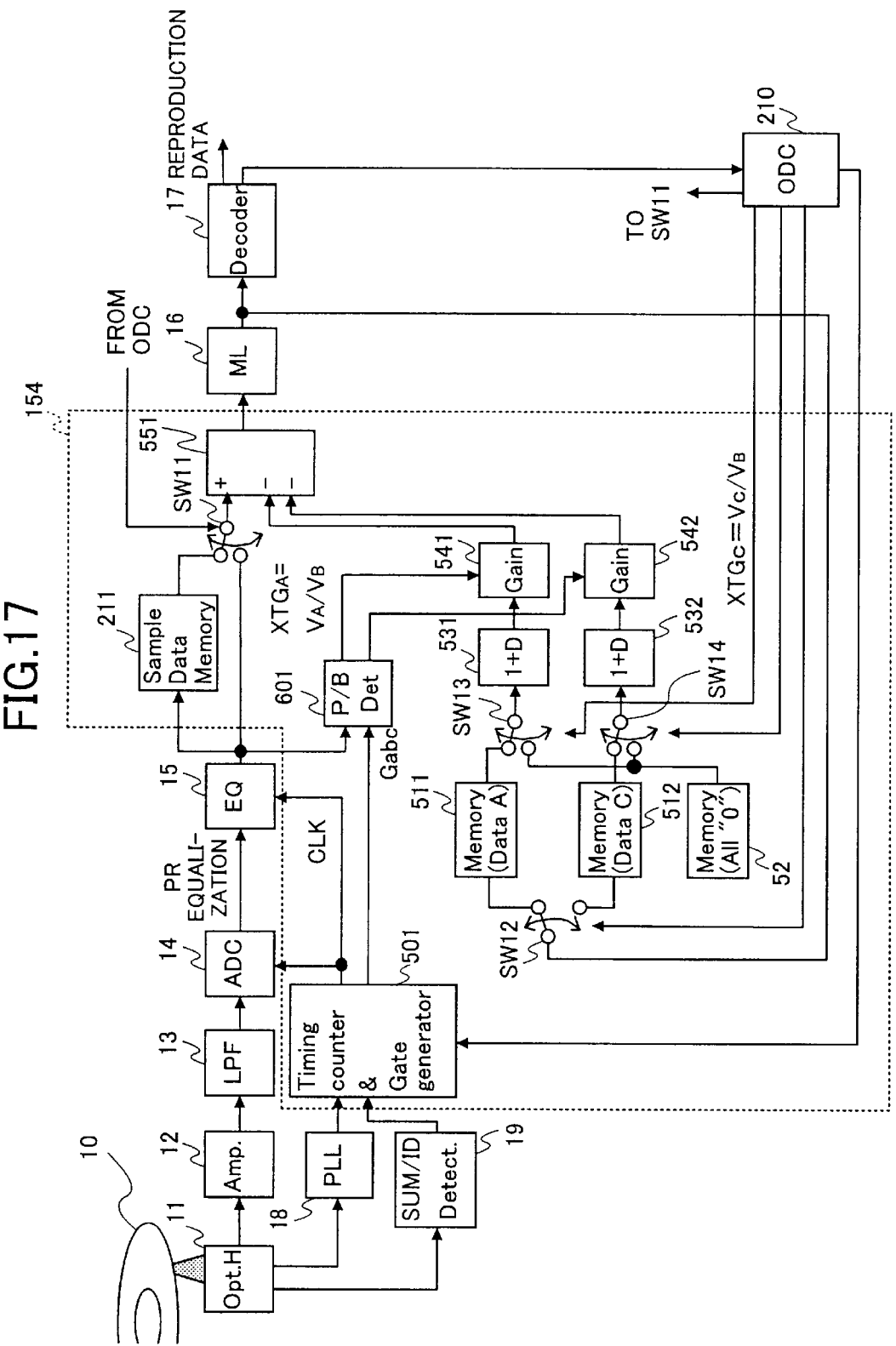
FIG. 17 is a diagram showing a configuration example of the fifth reproduction circuit.

FIG. 17 is a diagram showing a configuration example of the fifth reproduction circuit. In FIG. 17, circuits that are the same as the ones in FIG. 6 are indicated by the same reference numerals and the explanation thereof will be omitted. Moreover, a portion 154 surrounded by a dotted line shows a characteristic configuration in the fifth reproduction circuit.

Referring to FIG. 17, the fifth reproduction circuit includes the optical head 11 for reading recorded data in the recording medium 10, the amplifier 12 for amplifying the reproduction signal, the LPF (low pass filter) 13 for eliminating high frequency noise, the ADC (A/D converter) 14 for converting the reproduction signal into digital data, the EQ 15 for equalizing to a predetermined waveform, a memory 211 for storing the sample data reproduced, a calculator 551 for deducting the crosstalk from the regenerative signal, the ML detector 16 for detecting data based on a most-likelihood, the decoder 17 for decoding data and outputting reproduction data, the PLL (Phase Locked Loop) 18 for conducting a phase comparison, the SUM/ID detector 19 for detecting address information, a timing counter and gate generator 501 for generating the timing and the gate signal for sampling, memories 511 and 512 for storing the detected data, the memory 52 for storing "0 (zero)" data only, 1+D circuits 531 and 532 for generating the PR(1,1) waveform, gain adjusting circuits 541 and 542 for adjusting crosstalk gains, a P/B (peak/bottom) detector 601 for detecting the peak and the bottom of the sample value, and an ODC (optical control circuit) 210 for controlling the fifth reproduction circuit.

Based on the address information detected by the SUM/ID detector 19, the timing counter and gate generator 501 generates gate signals as a gate A corresponding to a previous track that is before the target track, a gate B corresponding to the target track to be reproduced, and a gate C corresponding to a next track that is after the target track.

The P/B detector 601 obtains the signal amplitude $V_A$, $V_B$, and $V_C$ in accordance with the gate signal supplied from the timing counter and gate generator 501, by calculating differences between the peak values and the bottom values, respectively. Furthermore, based on the signal amplitude VA, VB, and VC, the P/B detector 601 obtains crosstalk gains $XTG_A$ $(=V_A/V_B)$ and $XTG_C$ $(=V_A/V_C)$ and supplies to the gain adjusting circuits 541 and 542, respectively.

In a case in which a track T3n is the target track, in order to conduct the crosstalk cancellation, the ODC 210 stores the detected data of the track T3n−1 corresponding to the gate A in the memory 511 by switching a switch SW12, and controls to store the detected data of a track T3n+1 corresponding to the gate C in the memory 512. On the other hand, in a case in which the crosstalk cancellation is not conducted, the ODC 210 switches switches SW13 and SW14 to the memory 52 storing "0" only. Moreover, the ODC 210 controls the switch SW11 and enables the calculator 551 to obtain the sample data that is reproduced, from the memory 211.

The 1+D circuits 531 and 532 produce the ideal PR waveforms for data stored in memories 511 and 512, respectively, by conducting a 1+D process (delay by one clock).

The gain adjusting circuits 541 and 542 adjust the gain of the crosstalk gain $XTG_A$ and $XTG_C$, and supply to the calculator 55.

The calculator 551 cancels the crosstalk of the track T3n by deducting one crosstalk signal from the previous track T3n−1 and another crosstalk signal from the next track T3n+1, from the reproduction signal from the target track T3n.

Figure 18:
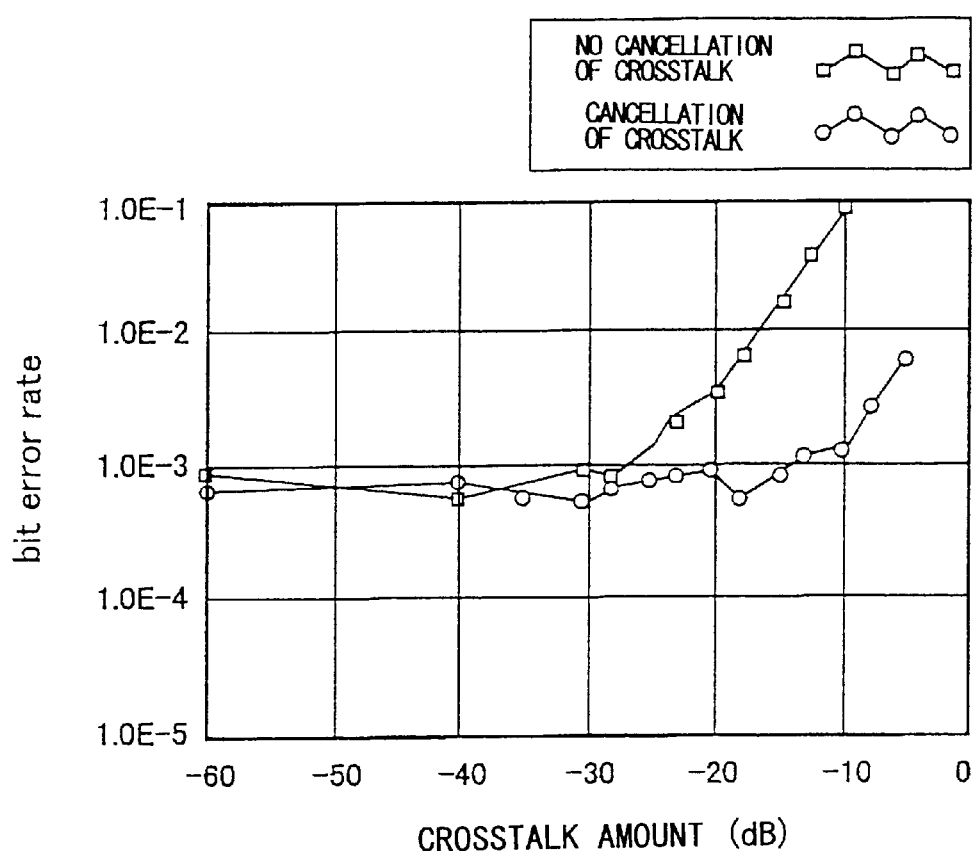
FIG. 18 is a diagram showing an effect of the crosstalk cancellation.

FIG. 18 is a diagram showing an effect of the crosstalk cancellation.

Referring to FIG. 18, in a case in which the crosstalk is cancelled according to the embodiment as described above, compared with another case in which the crosstalk is not cancelled, for example, even if the crosstalk amount increases by 15 dB from −30 dB to −15 dB, data can be reproduced at the same bit error rate as a case in which no crosstalk occurs.

In the embodiment as described above, data recorded on the target track and the adjacent tracks are reproduced by one beam and the sampled data of the reproduction signal is stored in the memories. The detected data processed by the ML detector 16 is stored the memories 511 and 512 as the reproduction signal of the adjacent track, so as to use as a cancel signal.

Since the detected data to store can be set to "0 (zero)" or "1", it is possible to produce a crosstalk signal by synthesizing with a PR characteristic. In this case, instead of storing the sample value after processed by the ADC 14 and the EQ 15, a one-bit data string is stored in the memories 511 and 512. Therefore, it is possible to reduce the memory amount.

Moreover, the measurement area of crosstalk is provided and the predetermined signal for measuring crosstalk (for example, the 2T-repeated signal) is provided to form a stagger. Thus, it is possible to prevent the crosstalk from occurring from the adjacent tracks. As the measurement area, the existing areas (for example, the Read Clock Phase Control Area or the like) of the conventional format are used. That is, the existing area forms the measurement area of the crosstalk so as to shift for the adjacent tracks and a shifted portion is used as a buffer area.

In the measurement area, data is sampled in response to the gate signal sent from the timing counter and gate generator 50 or 501.

The sample value is classified into a peak point and a bottom point, and values at the peak point and the bottom point are averaged so as to obtain the peak value and the bottom value. By externally defining the average number, it is possible to control a range for obtaining the crosstalk cancel gain to be narrower or wider in order to correspond to any format for recording data.

Therefore, the crosstalk cancel gain can be varied and also the crosstalk cancel gain can be measured when data is reproduced.

Since the ODCs 20, 201 and 210 selects the memory 52 storing "0" only not to produce the crosstalk signal while processing the crosstalk cancellation, it is possible to conduct a crosstalk cancellation-off operation.

Furthermore, the crosstalk amount in the measurement area of the predetermined pattern can be measured by the cancellation-off operation.

In a case in which the track jump is conducted, data recorded on the adjacent track is reproduced while tracking from one or more tracks inner (or outer) than the target track, and then data recorded on the target track is gradually reproduced. At a first track when the track jump is conducted, the recorded data is reproduced without conducting an off-track. The off-track is conducted from the next track to reproduce two tracks simultaneously, and the crosstalk is cancelled to properly reproduce the recorded data. After the track jump, the crosstalk cancel gain is set to "0" for the first track and then the crosstalk cancel gain is gradually increased. When the crosstalk cancel gain becomes "1", the crosstalk cancel gain maintains "1". Consequently, it is possible to properly avoid a data error when the track jump is conducted.

The reproduction process at higher speed can be realized by providing a plurality of memories corresponding to a sector number of one track (in circumferential direction).

Alternatively, the reproduction process at higher speed can be realized by providing a plurality of memories corresponding to a track number in a radius direction.

In the method for canceling the crosstalk in the embodiment describe above, the crosstalk signal generated from at least one adjacent track is deducted from the reproduction signal when the data part (MO part) recorded on the recording medium 10 is reproduced. Next, a method for canceling the crosstalk in a case of reproducing an address part (pre-pit part) will now be described.

Figure 19:
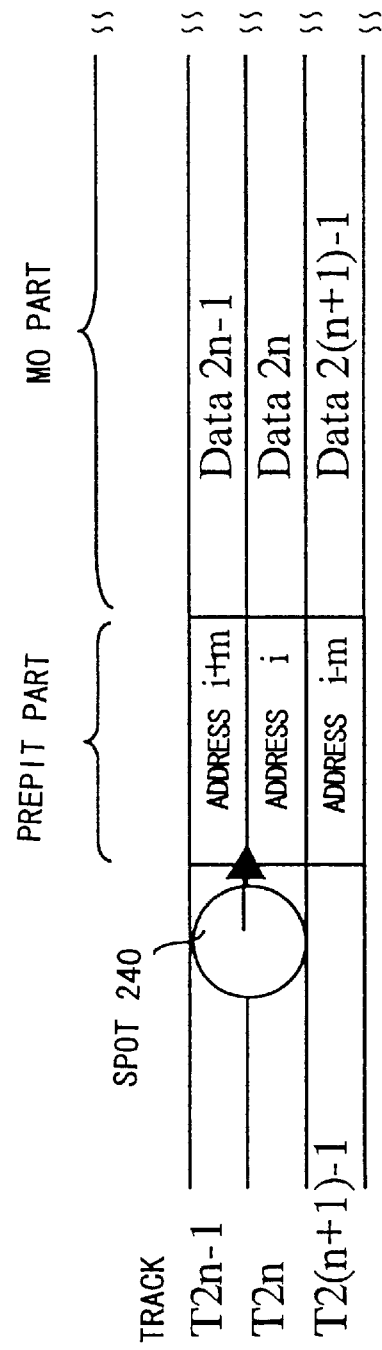
FIG. 19 is a diagram showing a spot position of the optical beam when the address part is reproduced.

FIG. 19 is a diagram showing a spot position of the optical beam when the address part is reproduced. In FIG. 19, for example, in a case in which the track T2n (n denotes a natural number) is reproduced similar to the case of reproducing the data part, the optical beam simultaneously irradiates two tracks of the track T2n−1 and the track T2n by a spot 240 shifting toward the adjacent track T2n−1, and the pre-pit parts showing addresses i+m and i are read. In this case, differently from the data part, the address i+m of the adjacent track T2n−1 is known. For example, as shown in FIG. 20, circuits can be configured so as to directly generate the crosstalk from the address i+m.

Figure 20:
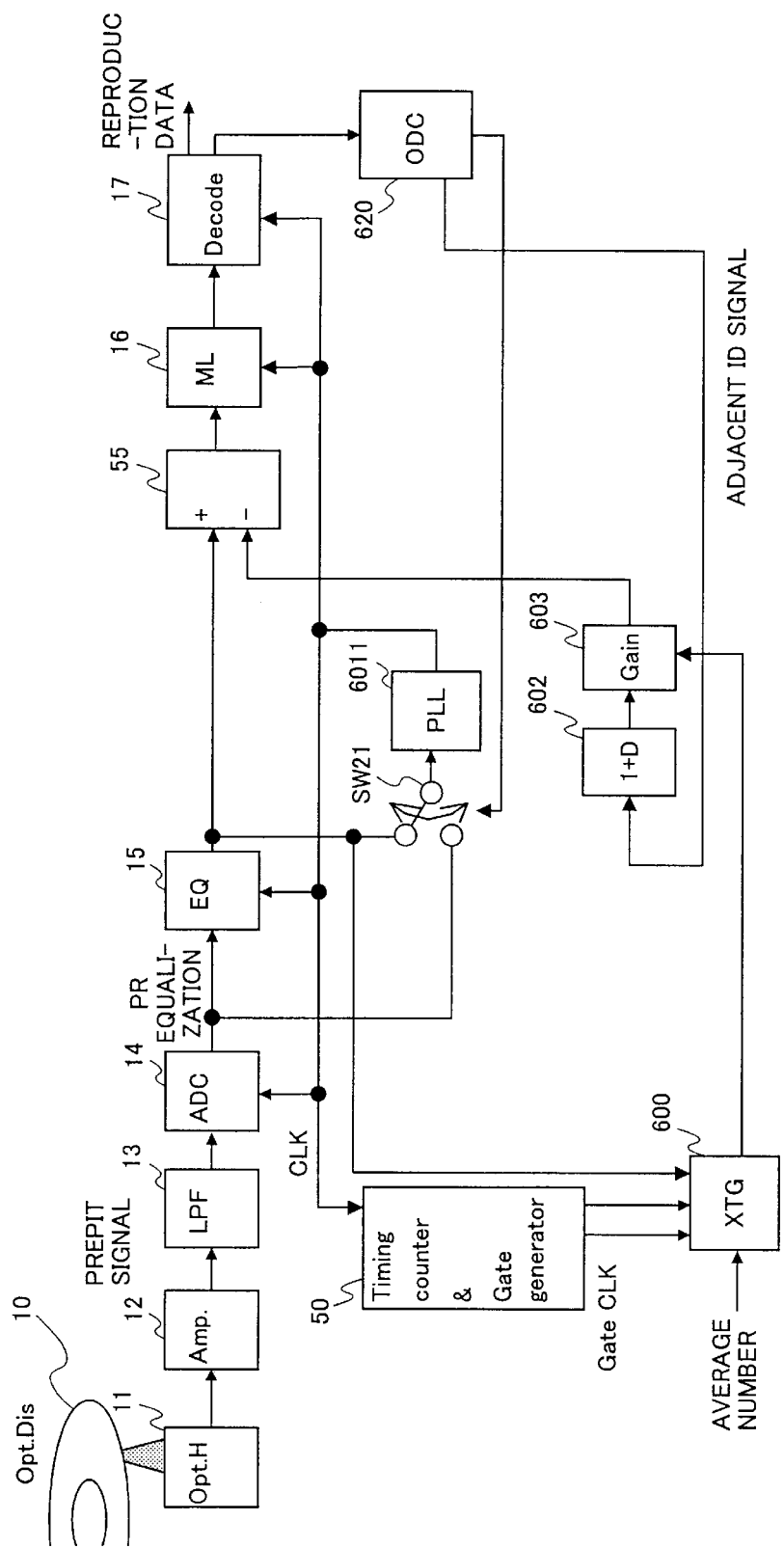
FIG. 20 is a diagram showing a configuration example of a sixth reproduction circuit.

FIG. 20 is a diagram showing a configuration example of a sixth reproduction circuit. Referring to FIG. 20, the sixth reproduction circuit includes the optical head 11 for reading recorded data in the recording medium 10, the amplifier 12 for amplifying the reproduction signal, the LPF (low pass filter) 13 for eliminating high frequency noise, the ADC (A/D converter) 14 for converting the reproduction signal into digital data, the EQ (digital equalizer) 15 for equalizing to a predetermined waveform, the calculator 55 for deducting the crosstalk from the reproduction signal, the ML detector 16 for detecting data based on a most-likelihood, the decoder 17 for decoding data and outputting reproduction data, a PLL (Phase Locked Loop) 6011 for conducting a phase comparison, the timing counter and gate generator 50 for generating the timing and the gate signal to sample, a 1+D circuit 602 for generating the PR(1,1) waveform, a gain adjusting circuit 603 for adjusting the crosstalk gain, a crosstalk gain calculator 600 for detecting the peak value and bottom value of the sample data and calculating the crosstalk gain showing a crosstalk elimination ratio, and an ODC (optical disk controller) 620 for controlling the sixth reproduction circuit.

The reproduction signal which read recorded data in the recording medium 10 by the optical head 11 is amplified by the amplifier 12, high frequency noise is eliminated by the LPF 13, and then the reproduction signal is supplied to the ADC 14.

Based on the reference clock CLK supplied from the PLL 6011, in response to the timing provided by the timing counter and gate generator 50, the reproduction signal is sampled by the ADC 14. The sample value obtained by sampling is equalized into a desired PR (Partial Response) waveform by the EQ 15. Then, data is detected based on the PR waveform by the ML decoder 16, and decoded and output by the decoder 17.

In order to lead sampling data from ADC 14 at high speed when leading into the PLL 6011, a switch SW21 provided to the PLL 6011 is switched to the ADC 14. And the switch SW21 is switched to the EQ 15 in order to synchronize using data so that the data from the EQ 15 is properly sampled as expected by the PRML after leading the sampling data. A switching timing is controlled by the ODC 620 or a counter similar to the ODC 620.

In a case in which the ODC 620 conducts the crosstalk cancellation, for example, in a case in which the track T2n is reproduced as shown in FIG. 19, the ODC 620 supplies a signal showing the address i+m of the adjacent track T2n−1 as an adjacent ID signal to the 1+D circuit 602. Moreover, when the track jump is conducted, the ODC 620 supplies all "0 (zero)" not to conduct the crosstalk cancellation. The ODC 620 controls a switch SW21 of the PLL 6011.

For example, in a case in which the track T2n is reproduced as shown in FIG. 19, the crosstalk gain calculator 600 calculates the crosstalk gain based on a phase difference between the track T2n and the adjacent track T2n−1, and supplies to the gain adjusting circuit 603. In a case of synthesizing a predetermined PR waveform based on the adjacent ID signal supplied by the ODC 620, for example, in a case of synthesizing the PR(1,1) waveform, the 1+D circuit 602 conducts the 1+D process (delay for one clock) and for example, produces the ideal PR waveform for the address i+m adjacent to the track T2n. The gain adjusting circuit 603 adjusts the ideal PR waveform produced by the 1+D circuit 602 based on the crosstalk gain calculated by the crosstalk gain calculator 600.

The calculator 55 deducts the crosstalk gain adjusted by the gain adjusting circuit 603 from the sample value equalized into the PR waveform by the EQ 15. Thus, the crosstalk is cancelled. A most-likelihood is detected from the reproduction signal, in which the crosstalk is cancelled, by the ML detector 16, data is detected based on the most-likelihood, and the data is decoded by the decoder 17.

Figure 21:
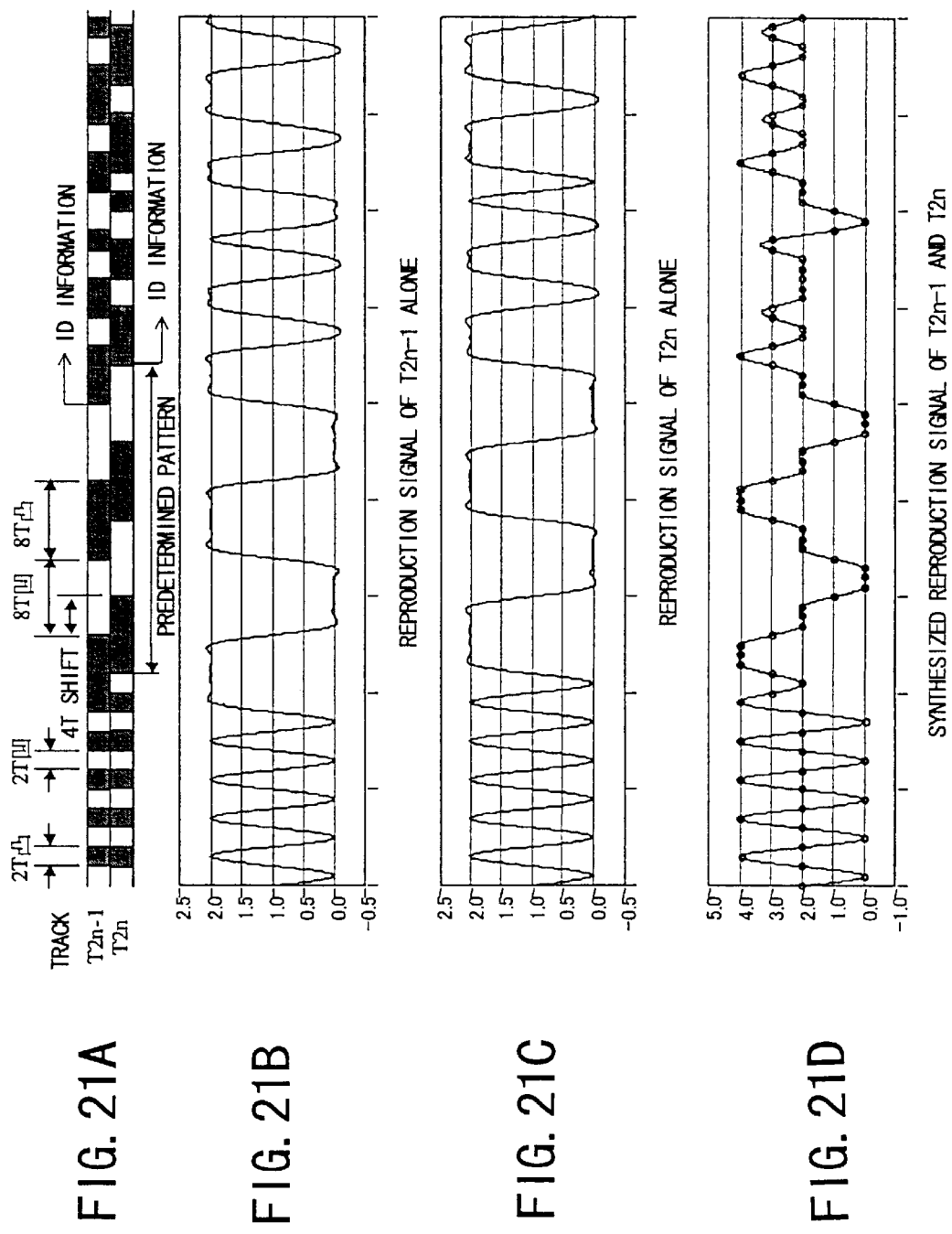
FIG. 21A is a diagram showing a record example of the pre-pit.
FIG. 21B is a diagram showing the reproduction signal of the track T2n−1 only.
FIG. 21C is a diagram showing the reproduction signal of the track T2n only.
FIG. 21D is a diagram showing a synthesized reproduction signal of the track T2n−1 and the track T2n.

FIG. 21A is a diagram showing a record example of the pre-pit. Referring to the record example of the pre-pit shown in FIG. 21A, for example, in the pre-pit part (address part) of the track T2n−1, an ID information showing the address i+m is recorded after a predetermined pattern. The predetermined pattern is formed by recording the 2T-repeated data (2T convex part) at 2T interval (2T concave part) and the 8T-repeated data (8T convex part) twice at 8t interval (8T concave part). Moreover, in the pre-pit part of the track T2n, the 2T-repeated data is recorded four times at 2T interval and the 2T-repeated data is further recorded once so as to shift the predetermined pattern. Then, similarly to the track T2n−1, the ID information showing the address i is recorded after the predetermined pattern. Consequently, the predetermined pattern is recorded so as to shift by 4T from the adjacent track.

FIG. 21B is a diagram showing the reproduction signal of the track T2n−1 only and FIG. 21C is a diagram showing the reproduction signal of the track T2n only. Referring to FIG. 21B and FIG. 21C, amplitude of the reproduction signal is higher at the convex part recording data and is lower at the concave part of interval. The predetermined pattern is formed at a record position so that a phase of the reproduction signal of the track T2n delays by 2T.

FIG. 21D is a diagram showing a synthesized reproduction signal of the track T2n−1 and the track T2n. Referring to FIG. 21D, in a case in which two reproduction signals causes the crosstalk at one-to-one ratio when the optical beam scans the track T2n−1 and the track T2n simultaneously as shown in FIG. 19, the reproduction signals shown in FIG. 21B and FIG. 21C are synthesized to form a synthesized reproduction signal. That is, referring to FIG. 21D, the amplitude of the synthesized reproduction signal becomes "2" in the 2T-repeated data part and a level difference is formed on the waveform of the synthesized reproduction signal in the 8T-repeated data part. The crosstalk amount is obtained using the level difference on the waveform of the synthesized reproduction signal.

Figure 22:
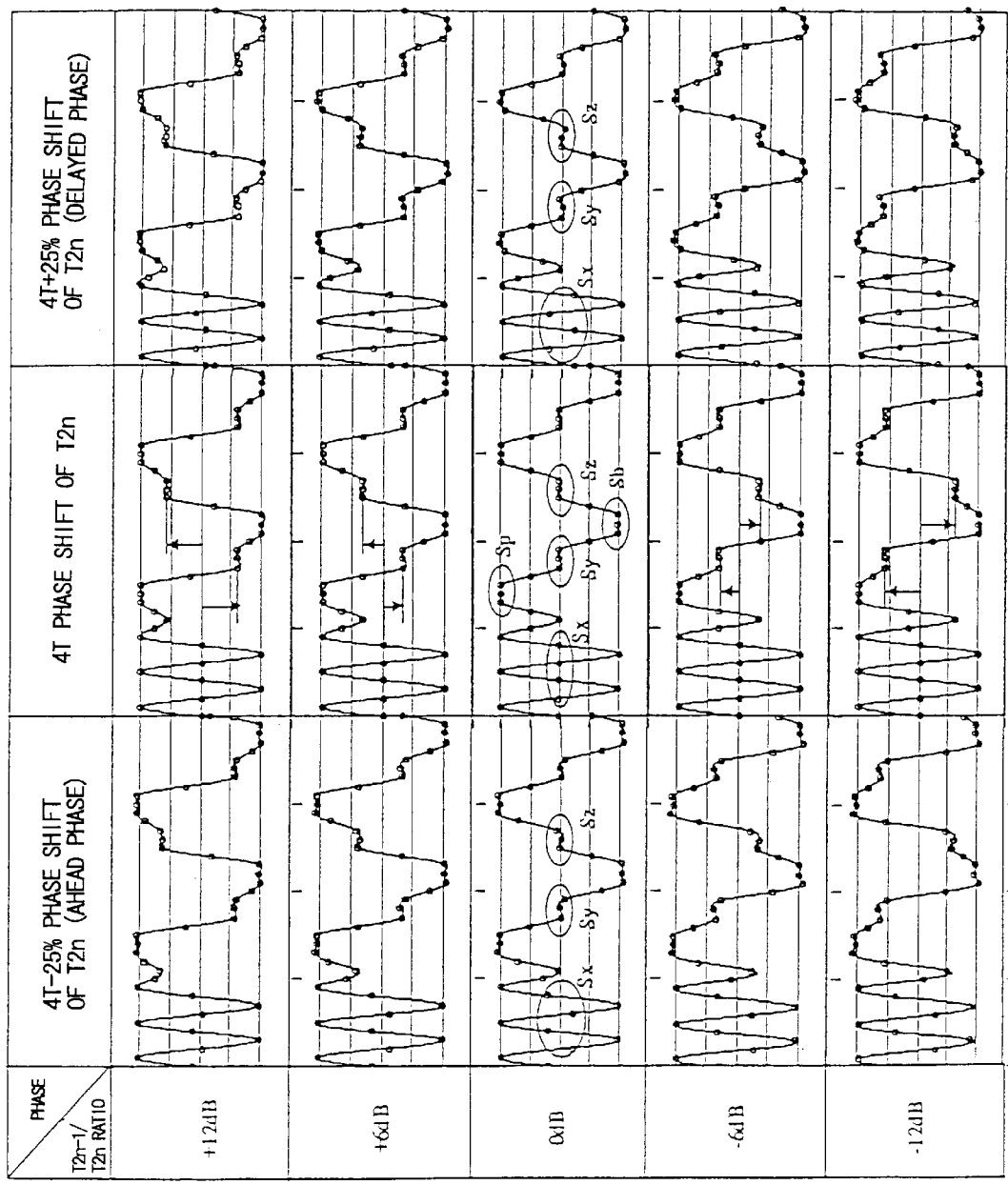
FIG. 22 is a diagram showing an example of waveform change caused by a crosstalk amount and a phase shift.

FIG. 22 is a diagram showing an example of waveform change caused by the crosstalk amount and a phase shift. Referring to a correspondence table of FIG. 22, the waveform change of an interference-wave, which is caused by the crosstalk amount and the phase shift from the adjacent track (for example, the track T2n−1) at the predetermined pattern, is shown. The crosstalk amount is shown by a ratio (logarithm of [signal of the track T2n−1]/[signal of the track T2n] ratio (hereinafter, called T2n−1/T2n ratio)) of signals from the track T2n−1 and the track T2n. When the crosstalk amount is changed, the amplitude of the synthesized reproduction signal is changed. In this case, the amplitude is controlled by an AGC (Auto Gain Control) so as to be constant. In FIG. 22, it is shown that the T2n−1/T2n ratio showing the crosstalk amount becomes higher when a center of the optical beam shifts more toward a side of the track T2n−1 and the crosstalk amount becomes lower when the center of the optical beam shifts more toward a side of the track T2n. Also, in FIG. 22, as a phase shift state, three states of a "4T−25% phase shift of T2n" state, a "4T phase shift of T2n" state, and a "4T+25% phase shift of T2n" state are shown. The "4T−25% phase of T2n" state shows that the phase of the track T2n is ahead by a 4T−25% phase from the phase of the track T2n−1. The "4T phase shift of T2n" state shows that the phase of the track T2n is shifted by a predetermined 4T phase from the track T2n−1. The "4T+25% phase shift of T2n" state shows that the phase of the track T2n is delayed from the phase of the track T2n−1. For example, a waveform in which the T2n−1/T2n ratio showing the crosstalk amount indicates "0 (zero)" dB and the phase shift between the track T2n−1 and the track T2n indicates the "4T phase shift of T2n" state, corresponds to the synthesized reproduction signal shown in FIG. 21D.

Based on each waveform corresponding to the crosstalk amount and the phase shift, the reproduction signal is sampled and an amplitude ratio is calculated by amplitude (Sp−Sb) in the predetermined pattern part and the level difference (Sy−Sz) where the amplitude is changed by the crosstalk, so that the crosstalk amount for canceling the crosstalk can be obtained. It should be noted that a reference numeral Sp indicates a peak value and a reference numeral Sb indicates a bottom value.

Figure 23:
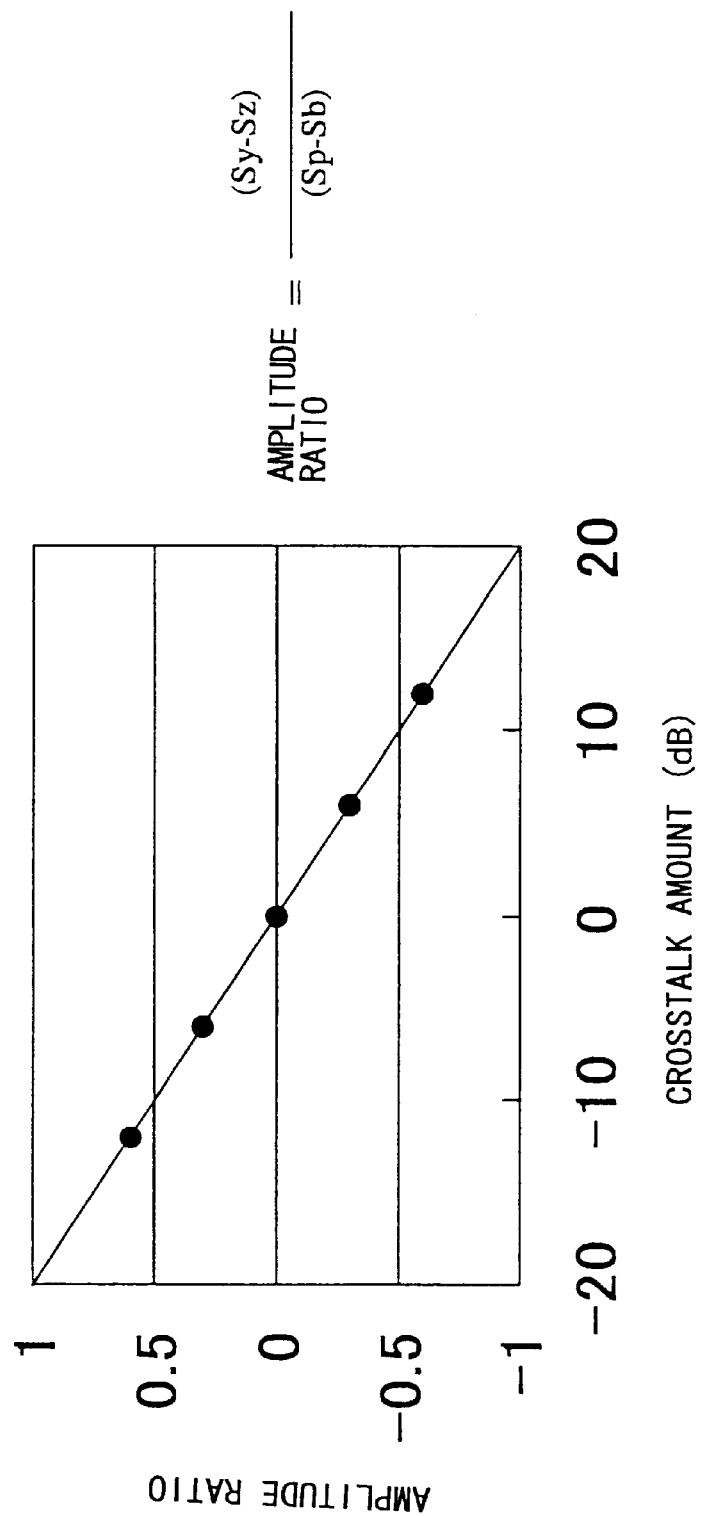
FIG. 23 is a diagram showing a relationship between the amplitude ratio and the crosstalk amount.

FIG. 23 is a diagram showing a relationship between the amplitude ratio and the crosstalk amount. Referring to FIG. 22, for example, in a waveform in which the T2n−1/T2n ratio is 0 (zero) dB in any one of the "4T−25% phase shift of T2n" state, the "4T phase shift of T2n" state, and the "4T+25% phase shift of T2n" state, the amplitude difference (Sy−Sz) is approximately 0 (zero) dB. Thus, the amplitude ratio is approximately 0 (zero) dB. Referring to FIG. 23, the crosstalk amount for the amplitude ratio (gain) "0 (zero)" shows "0 (zero)". Thus, the same result as that shown in the correspondence table of FIG. 22 can be obtained. Also, in any waveform in the "4T−25% phase shift of T2n" state, the "4T phase shift of T2n" state, and the "4T+25% phase shift of T2n" state, the larger negative the amplitude difference (Sy−Sz) becomes (that is, the optical beam shifts to track T2n−1 side), the larger positive the amplitude (Sp−Sb) of the predetermined pattern part becomes. Consequently, the crosstalk amount to be canceled is positively increased. On the other hand, even in any waveform in the "4T−25% phase shift of T2n" state, the "4T phase shift of T2n" state, and the "4T+25% phase shift of T2n" state, the greater positive the amplitude difference (Sy−Sz) becomes (that is, the optical beam shifts to track T2n side), the greater negative the crosstalk amount to be cancelled becomes. Accordingly, the same result as that shown in the correspondence table of FIG. 22 can be obtained.

Therefore, it is possible to obtain the crosstalk amount for change of the waveform shown in FIG. 22 by the relationship between the amplitude ratio and the crosstalk amount shown in FIG. 23.

Next, a circuit configuration of the crosstalk gain calculator 600 for calculating the crosstalk gain based on the relationship shown in FIG. 23.

Figure 24:
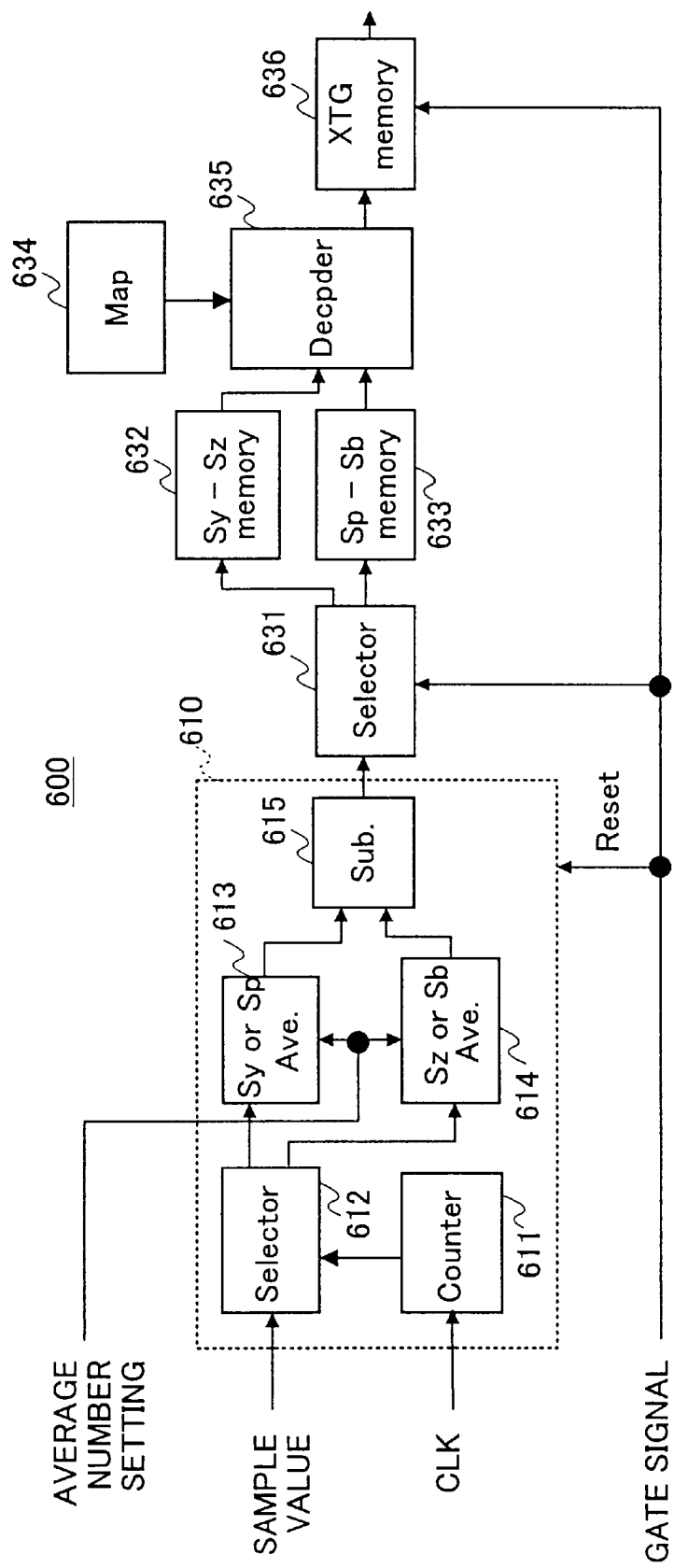
FIG. 24 is a diagram showing a circuit configuration example of the crosstalk gain calculator.

FIG. 24 is a diagram showing a circuit configuration example of the crosstalk gain calculator. The crosstalk gain claculator 600 shown in FIG. 20 includes an amplitude value calculating circuit 610 for obtaining an average of the amplitude (Sp–Sb) in the predetermined pattern part and an average of the amplitude (Sy–Sz) changed by the crosstalk, a selector 631 for selecting a memory in response to a gate signal, a Sy–Sz memory 632 for storing the amplitude (Sy–Sz) changed by the crosstalk, a Sp–Sb memory for storing the amplitude (Sp–Sb) in the predetermined pattern part, a map 634 having a relationship table as shown in FIG. 23, a decoder 635 for obtaining the crosstalk amount from the amplitude ration by referring to the map 634, and an XTG memory 636 for storing the crosstalk gain. In addition, the amplitude value calculating circuit 610 includes a counter 611 for counting a clock CLK, a selector 612 for selecting Sy, Sp, Sz, or Sb by counting the sample value by the clock CLK, an averaging circuit 613 for averaging Sy or Sp based on an average number, an averaging circuit 614 for averaging Sz or Sb based on an average number, and a subtractor 615 for calculating an average difference of the averages calculated by the averaging circuit 613 and the averaging circuit 614.

The amplitude value calculating circuit 610 calculates an average value of sample value Sy by the averaging circuit 613 and also calculates an average value of sample value Sz by the averaging circuit 614. In response to the gate signal, the sample values Sy and Sz are supplied from the selector 612 to the amplitude value calculating circuit 610 every predetermined count number. A value resulted in subtracting the average value of the sample value Sz the average value of the sample value Sy is supplied to the selector 631 by the subtractor 615. Moreover, the amplitude value calculating circuit 610 an average value of sample value Sp by the averaging circuit 613 and also calculates an average value of sample value Sb by the averaging circuit 614. In response to the gate signal, the sample values Sp and Sb are supplied from the selector 612 to the amplitude value calculating circuit 610 every predetermined count number. A value resulted in subtracting the average value of the sample value Sb the average value of the sample value Sp is supplied to the selector 631 by the subtractor 615.

The selector 631 selects the Sy–Sz memory 632 or the Sp–Sz memory 633 in response to the gate signal, in order to store the average value supplied from the amplitude value calculating circuit 610. The decoder 635 calculates the amplitude ratio ((Sy–Sz)/(Sp–Sz)) based on the average value stored in the Sy–Sz memory 632 or the Sp–Sz memory 633, obtains the crosstalk amount for the amplitude ration by referring to the map 634, and stores the crosstalk amount as the crosstalk gain in the XTG memory 636. The XTG memory 636 supplies the crosstalk gain to the gain adjusting circuit 603 shown in FIG. 20 in response to the gate signal.

As described above, it is possible to cancel the crosstalk signal, without providing an extra memory area in a direction of arranging the bits in the pre-pit part on the recording medium 10 such as conventional format.

Without degrading the format effect in the address information area, it is possible to cancel the crosstalk of the address signal. Moreover, since the track density can be improved higher, the format effect is improved and then the record density can be improved.

In the embodiment, the memory 51 in FIG. 6 corresponds to a storing part, the 1+D circuit 53 corresponds to a crosstalk signal generating part, and the calculator 55 corresponds to a crosstalk signal eliminating part.

As describe above, according to the present invention, the crosstalk signal from the adjacent track is generated and then the crosstalk signal can be eliminated from the target reproduction signal from the target track to be reproduced. Therefore, it is possible to improve the quality of the reproduction signal from data recorded on the recording medium in which tracks are formed at high density. In addition, since the detected data detected in accordance with the predetermined algorithm is stored and also the detected data is a bit value, it can be realized to eliminate the crosstalk by less storage area.

Moreover, according to the present invention, the predetermined measurement data is recorded on the recording medium and a precise crosstalk amount can be obtained by reading the measurement data. In addition, it is possible to variably eliminate the crosstalk signal from the reproduction signal by the crosstalk elimination ratio.

The present invention is not limited to the specifically disclosed embodiments, variations and modifications, and other variations and modifications may be made without departing from the scope of the present invention.

The present application is based on Japanese Priority Application No.2001-288470 filed on Sep. 21, 2001, the entire contents of which are hereby incorporated by reference.

What is claimed is:

1. An apparatus for reproducing recorded data by decoding a reproduction signal read from the recorded data recorded on a recording medium in accordance with a predetermined algorithm, said apparatus comprising:

a crosstalk signal generating part generating a crosstalk signal by converting adjacent data recorded on an adjacent track into a waveform of said reproduction signal; and a crosstalk signal eliminating part eliminating said crosstalk signal by deducting from said reproduction signal, wherein said reproduction signal in which said crosstalk signal is eliminated is decoded in accordance with said predetermined algorithm and reproduced.

2. The apparatus as claimed in claim 1, further comprising a storing part having at least one memory and storing detected data detected by said predetermined algorithm when said recorded data is user data, wherein said crosstalk signal generating part generates said crosstalk signal by converting said detected data stored in said storing part into said waveform of said reproduction signal, and said reproduction signal showing said user data, in which said crosstalk signal is eliminated by said crosstalk signal eliminating part, is decoded by said predetermined algorithm and reproduced.

3. The apparatus as claimed in claim 2, further comprising:

a measurement data recording part recording a predetermined measurement data to measure a crosstalk amount; and an elimination ratio obtaining part obtaining the crosstalk amount based on said measurement data read from said recording medium and obtaining a crosstalk elimination ratio, wherein said crosstalk signal generated by said crosstalk signal generating part is eliminated from said reproduction signal based on said crosstalk elimination ratio.

4. The apparatus as claim in claim 3, wherein said measurement data recording part records said measurement data so as to shift from said measurement data recorded on said adjacent track.

5. The apparatus as claimed in claim 3, wherein said measurement data recording part records a predetermined data as the measurement data so as to shift from recording positions of an area for recording said predetermined data and a buffer area in a header part of the recorded data, so that one of said recording positions is shifted for said measurement data recorded on said adjacent track.

6. The apparatus as claimed in claim 3, further comprising a gate signal generating part generating a gate signal in response to reading said measurement data, wherein said elimination ratio obtaining part obtains a first crosstalk amount based on the reproduction signal from at least one adjacent track and a second crosstalk amount based on the reproduction signal from a target track to be reproduced in response to said gate signal generated by said gate signal generating part, and obtains said crosstalk elimination ratio.

7. The apparatus as claimed in claim 6, wherein said elimination ratio obtaining part obtains said crosstalk elimination ratio by dividing said first crosstalk amount based on said measurement data read from said adjacent track by said second crosstalk amount based on said measurement data read from said target track.

8. The apparatus as claimed in claim 3, wherein said elimination ratio obtaining part comprises:
 a peak average value calculating part calculating an average of peak values of said reproduction signal of said measurement data;
 a bottom average value calculating part calculating an average of bottom values of said reproduction signal of said measurement data; and
 an average value calculating part calculating a difference between the average values of said peak values and said bottom values,
 so as to obtain said crosstalk elimination ratio by defining said difference as said crosstalk elimination ratio.

9. The apparatus as claimed in claim 8, wherein said peak average value calculating part and said bottom peak average value calculating part calculate said average of said peak values and said average of said bottom values based on a value number externally defined.

10. The apparatus as claimed in claim 2, further comprising a zero data storing part storing zero data only wherein said crosstalk signal generating part obtains said zero data from said zero data storing part when said crosstalk signal is not generated.

11. The apparatus as claimed in claim 2, wherein said storing part comprises sector memories for a number of sectors so as to store said detected data detected in accordance with said predetermined algorithm for each sector.

12. The apparatus as claimed in claim 11, wherein each of said sector memories includes track memories for a number of tracks so as to store said detected data detected in accordance with said predetermined algorithm for each sector for each track.

13. The apparatus as claimed in claim 2, further comprises a read signal converting part converting decoded data into a read signal for reading said recorded data recorded on said recording medium,
 wherein said storing part stores said decoded data, said read signal converting part converts said decoded data stored by said storing part into said read signal, and said crosstalk signal generating part converts said read signal converted by said read signal converting part into said waveform of said reproduction signal.

14. The apparatus as claimed in claim 13, wherein said read signal converting part comprises:
 an encoding part encoding data; and
 a non-return-to-zero circuit converting said data encoded by said encoding part.

15. The apparatus as claimed in claim 2, further comprising a read signal converting part converting corrected data into said read signal for reading said recorded data recorded on said recording medium,
 wherein said storing part converts said corrected data stored by said storing part into said read signal and said crosstalk signal generating part converts said read signal converted by said read signal converting part into said waveform of said regeneration signal.

16. The apparatus as claimed in claim 2, further comprising a read controlling part controlling reading of said recorded data recorded on a target track to be reproduced by an off-track,
 wherein said crosstalk signal eliminating part eliminates an actual crosstalk signal caused by said off-track from one side of an adjacent track, by deducting said crosstalk signal generated by said crosstalk signal generating part from said reproduction signal.

17. The apparatus as claimed in claim 16, wherein said read controlling part controls jumping of a track located at one or more tracks distant from a target track to be reproduced when a track jump is conducted and conducts a reproduction process for said target track by an on-track.

18. The apparatus as claimed in claim 17, wherein said read controlling part controls jumping of a landing track by the on-track when the track jump is conducted.

19. The apparatus as claimed in claim 16, wherein said elimination ratio obtaining part sets zero as said crosstalk elimination ratio for a landing track when the track jump is conducted and increases said crosstalk elimination ratio while approaching said target track.

20. The apparatus as claimed in claim 16, wherein said elimination ratio obtaining part maintains said crosstalk elimination ratio at "1" after said crosstalk elimination ratio reaches "1".

21. The apparatus as claimed in claim 2, further comprising a target reproduction signal storing part storing said reproduction signal read from a target track to be reproduced,
 wherein:
 said storing part includes two memories and stores a previous detected data detected from a previous track of said target track and a next detected data detected from a next track of said target track;
 said crosstalk signal generating part generates a previous crosstalk signal and a next crosstalk signal based on said previous detected data and said next detected data; and
 said crosstalk signal eliminating part deducts said previous crosstalk signal and said next crosstalk signal from said reproduction signal stored in said target reproduction signal storing part.

22. The apparatus as claimed in claim 1, wherein when said recorded data is address information, said crosstalk signal generating part generates said crosstalk signal by converting adjacent address information adjacent to said recorded data into said waveform of said reproduction signal, so that said reproduction signal showing said address information, in which said crosstalk signal is eliminated by said crosstalk signal eliminating part, is decoded in accordance with said predetermined algorithm to reproduce.

23. The apparatus as claimed in claim 22, further comprising an amplitude ratio calculating part calculating a ratio of a signal amplitude shift of said reproduction signal of a predetermined data pattern recorded in said address information, as said crosstalk elimination ratio,
wherein said crosstalk signal eliminating part deducts said crosstalk signal from said reproduction signal based on said crosstalk elimination ratio.

24. The apparatus as claimed in claim 22, further comprising a recording part recording said predetermined data pattern shifting for a predetermined channel clocks when said adjacent address information is recorded on said recording medium.

25. The apparatus as claimed in claim 23, further comprising:
a map part mapping said crosstalk amount to said crosstalk elimination ratio; and
a crosstalk amount obtaining part obtaining said crosstalk amount corresponding to said crosstalk elimination ratio calculated by said amplitude ratio calculating part from said map part,
wherein said crosstalk signal eliminating part deducts said crosstalk signal from said reproduction signal based on said crosstalk amount.

* * * * *

UNITED STATES PATENT AND TRADEMARK OFFICE
CERTIFICATE OF CORRECTION

PATENT NO. : 6,724,702 B2
DATED : April 20, 2004
INVENTOR(S) : Taguchi et al.

It is certified that error appears in the above-identified patent and that said Letters Patent is hereby corrected as shown below:

<u>Column 22,</u>
Line 51, insert -- target reproduction signal -- between "said" and "storing".

Signed and Sealed this

Tenth Day of August, 2004

JON W. DUDAS
*Acting Director of the United States Patent and Trademark Office*